(12) United States Patent
Lawrence et al.

(10) Patent No.: US 8,299,927 B2
(45) Date of Patent: *Oct. 30, 2012

(54) ELECTROMAGNETIC RADIATION DECOUPLER

(75) Inventors: Christopher Robert Lawrence, Hampshire (GB); Paul Richard Clarke, Hampshire (GB); James Robert Brown, Hampshire (GB); William Norman Damerell, Hampshire (GB)

(73) Assignee: OMNI-ID Cayman Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,299

(22) Filed: Jun. 25, 2010

(65) Prior Publication Data

US 2011/0121079 A1    May 26, 2011

Related U.S. Application Data

(63) Continuation of application No. 11/474,082, filed on Jun. 23, 2006, now Pat. No. 7,768,400.

(30) Foreign Application Priority Data

| Jun. 25, 2005 | (GB) | 0512988.7 |
| Sep. 7, 2005 | (GB) | 0518152.4 |
| Oct. 8, 2005 | (GB) | 0521945.6 |
| Feb. 23, 2006 | (GB) | 0603542.2 |

(51) Int. Cl.
*G08B 13/14* (2006.01)
(52) U.S. Cl. ............... 340/572.1; 340/572.7; 340/572.8
(58) Field of Classification Search .... 340/572.1–572.9, 340/10.1, 10.6; 235/488, 492, 487, 380–385, 235/451
See application file for complete search history.

(56) References Cited

U.S. PATENT DOCUMENTS

| 3,065,752 A | 11/1926 | Fritz |
| 2,990,547 A | 6/1961 | McDougal |
| 4,242,685 A | 12/1980 | Sanford |
| 4,498,076 A | 2/1985 | Lichblan |
| 4,728,938 A | 3/1988 | Kaltner |
| 4,835,524 A | 5/1989 | Lamond et al. |

(Continued)

FOREIGN PATENT DOCUMENTS

EP    0512491    11/1992

(Continued)

OTHER PUBLICATIONS

Otomi et al., "Expansion of RFID-tag Reading Distance with Polarized Wave Conversion Adaptor", The 2004 Kansai-Chapter Joint Convention of Institute of Electrical Engineering, Japan, Collection of Lecture Articles, Nov. 2004.

(Continued)

*Primary Examiner* — Anh V La
(74) *Attorney, Agent, or Firm* — McDonnell Boehnen Hulbert & Berghoff LLP

(57) ABSTRACT

An electromagnetic radiation decoupler for decoupling radiation in the wavelength range $\lambda_{min}$ to $\lambda_{max}$. The decoupler has a first conductor layer in contact with a dielectric layer which comprises at least one area of absence and the thickness of the decoupler is less than $\lambda_{min}/4n$, where n is the refractive index of the dielectric. The dielectric layer may be sandwiched between two conductor layers, one of which has the structure described above. The invention is also directed to methods of using and various articles comprising such a decoupler.

14 Claims, 18 Drawing Sheets

U.S. PATENT DOCUMENTS

| | | | |
|---|---|---|---|
| 4,890,111 | A | 12/1989 | Nicolet et al. |
| 5,276,431 | A | 1/1994 | Piccolli et al. |
| 5,285,176 | A | 2/1994 | Wong et al. |
| 5,557,279 | A | 9/1996 | D'Hont |
| 5,565,875 | A | 10/1996 | Buralli et al. |
| 5,677,698 | A | 10/1997 | Snowdon |
| 5,682,143 | A | 10/1997 | Brady et al. |
| 5,949,387 | A | 9/1999 | Wu et al. |
| 5,973,600 | A | 10/1999 | Mosher, Jr. |
| 5,995,048 | A | 11/1999 | Smithgall et al. |
| 6,049,278 | A | 4/2000 | Guthrie et al. |
| 6,072,383 | A | 6/2000 | Gallagher, III et al. |
| 6,118,379 | A | 9/2000 | Kodukula et al. |
| 6,121,880 | A | 9/2000 | Scott et al. |
| 6,130,612 | A | 10/2000 | Castellano et al. |
| 6,147,605 | A | 11/2000 | Vega et al. |
| 6,172,608 | B1 | 1/2001 | Cole |
| 6,208,235 | B1 | 3/2001 | Trontelj |
| 6,229,444 | B1 * | 5/2001 | Endo et al. ................ 340/572.6 |
| 6,239,762 | B1 | 5/2001 | Lier |
| 6,265,977 | B1 | 7/2001 | Vega et al. |
| 6,271,793 | B1 | 8/2001 | Brady et al. |
| 6,285,342 | B1 | 9/2001 | Brady et al. |
| 6,307,520 | B1 | 10/2001 | Liu |
| 6,339,406 | B1 | 1/2002 | Nesic et al. |
| 6,366,260 | B1 | 4/2002 | Carrender |
| 6,456,228 | B1 | 9/2002 | Granhed et al. |
| 6,483,481 | B1 | 11/2002 | Sievenpiper et al. |
| 6,507,320 | B2 | 1/2003 | Von Stein et al. |
| 6,509,880 | B2 | 1/2003 | Sabet et al. |
| 6,516,182 | B1 | 2/2003 | Smit et al. |
| 6,552,696 | B1 | 4/2003 | Sievenpiper et al. |
| 6,642,898 | B2 | 11/2003 | Eason |
| 6,646,618 | B2 | 11/2003 | Sievenpiper |
| 6,812,893 | B2 | 11/2004 | Waterman |
| 6,816,380 | B2 | 11/2004 | Credelle et al. |
| 6,825,754 | B1 | 11/2004 | Rolin |
| 6,911,952 | B2 | 6/2005 | Sievenpiper et al. |
| 6,914,562 | B2 | 7/2005 | Forster |
| 6,944,424 | B2 | 9/2005 | Heinrich et al. |
| 6,946,995 | B2 | 9/2005 | Choi et al. |
| 7,075,437 | B2 | 7/2006 | Bridgelall et al. |
| 7,212,127 | B2 | 5/2007 | Jacober et al. |
| 7,225,992 | B2 | 6/2007 | Forster |
| 7,298,343 | B2 | 11/2007 | Forster et al. |
| 7,315,248 | B2 | 1/2008 | Egbert |
| 7,768,400 | B2 | 8/2010 | Lawrence et al. |
| 7,880,619 | B2 | 2/2011 | Brown et al. |
| 2001/0036217 | A1 | 11/2001 | Kopf et al. |
| 2002/0130817 | A1 | 9/2002 | Forster et al. |
| 2002/0167500 | A1 | 11/2002 | Gelbman |
| 2002/0170969 | A1 | 11/2002 | Bridgelall |
| 2002/0175873 | A1 | 11/2002 | King et al. |
| 2002/0177408 | A1 | 11/2002 | Forster et al. |
| 2003/0112192 | A1 | 6/2003 | King et al. |
| 2003/0169204 | A1 | 9/2003 | Saito |
| 2003/0197613 | A1 | 10/2003 | Hernandez et al. |
| 2004/0020036 | A1 | 2/2004 | Arneson et al. |
| 2004/0111338 | A1 | 6/2004 | Bandy et al. |
| 2004/0201522 | A1 | 10/2004 | Forster |
| 2005/0012616 | A1 | 1/2005 | Forster et al. |
| 2005/0030201 | A1 | 2/2005 | Bridgelall |
| 2005/0092845 | A1 | 5/2005 | Forster |
| 2005/0107092 | A1 | 5/2005 | Charych |
| 2005/0151699 | A1 | 7/2005 | Eastin |
| 2005/0200539 | A1 | 9/2005 | Forster et al. |
| 2006/0028344 | A1 | 2/2006 | Forster |
| 2006/0033609 | A1 | 2/2006 | Bridgelall |
| 2006/0043198 | A1 | 3/2006 | Forster |
| 2006/0049947 | A1 | 3/2006 | Forster |
| 2006/0055542 | A1 | 3/2006 | Forster et al. |
| 2006/0086808 | A1 | 4/2006 | Appalucci et al. |
| 2006/0220866 | A1 | 10/2006 | Dixon et al. |
| 2006/0220869 | A1 | 10/2006 | Kodukula et al. |
| 2006/0261950 | A1 | 11/2006 | Arneson et al. |
| 2007/0007342 | A1 | 1/2007 | Cleeves et al. |
| 2007/0285907 | A1 | 12/2007 | Nishikawa et al. |
| 2008/0129625 | A1 | 6/2008 | Svensson et al. |
| 2010/0045025 | A1 | 2/2010 | Cote et al. |
| 2010/0230497 | A1 | 9/2010 | Brown et al. |
| 2011/0037541 | A1 | 2/2011 | Johnson |

FOREIGN PATENT DOCUMENTS

| | | |
|---|---|---|
| EP | 0548851 | 12/1992 |
| EP | 1018703 | 7/2000 |
| EP | 1055943 | 11/2000 |
| EP | 1280231 | 1/2003 |
| EP | 1533867 | 5/2005 |
| EP | 1538546 | 6/2005 |
| EP | 1548629 | 6/2005 |
| EP | 1548639 | 6/2005 |
| GB | 2428939 | 2/2007 |
| JP | 63 151101 | 6/1988 |
| JP | 08-084013 | 3/1996 |
| JP | 2004054337 | 2/2004 |
| JP | 2004164055 | 6/2004 |
| JP | 2005-094360 | 4/2005 |
| JP | 2005-271090 | 10/2005 |
| JP | 2005-303528 | 10/2005 |
| JP | 2006-157905 | 6/2006 |
| JP | 2006-311239 | 11/2006 |
| WO | WO98/43217 | 10/1998 |
| WO | WO99/49337 | 9/1999 |
| WO | WO00/05467 | 2/2000 |
| WO | WO00/21031 | 4/2000 |
| WO | WO00/23994 | 4/2000 |
| WO | WO00/43952 | 7/2000 |
| WO | WO02/07084 | 1/2002 |
| WO | WO02/07496 | 1/2002 |
| WO | WO02/007584 | 9/2002 |
| WO | WO02/099764 | 12/2002 |
| WO | WO03/092119 | 4/2003 |
| WO | WO03/038747 | 5/2003 |
| WO | WO03/090314 | 10/2003 |
| WO | WO03/096478 | 11/2003 |
| WO | WO2004/025554 | 3/2004 |
| WO | WO2004/093242 | 10/2004 |
| WO | WO2004/093246 | 10/2004 |
| WO | WO2004/093249 | 10/2004 |
| WO | WO2004/097731 | 11/2004 |
| WO | WO2004/102735 | 11/2004 |
| WO | WO2005/045755 | 5/2005 |
| WO | WO2005/048181 | 5/2005 |
| WO | WO2006/006898 | 1/2006 |
| WO | WO2006/009934 | 1/2006 |
| WO | WO2006/044168 | 4/2006 |
| WO | WO2006/060324 | 6/2006 |
| WO | WO2006/105162 | 10/2006 |
| WO | WO 2007/000578 | 1/2007 |
| WO | WO 2007/144574 | 12/2007 |
| WO | WO 2008/071971 | 6/2008 |
| WO | WO 2008/075039 | 6/2008 |
| WO | WO 2008/078089 | 7/2008 |

OTHER PUBLICATIONS

Great Britain Search Report issued in case GB0512988.7, Nov. 28, 2006.

Great Britain Search Report issued in case GB0521945.6 , Mar. 3, 2006.

Great Britain Search Report issued in case GB0603542.2, Jul. 6, 2006.

Hibbins, et al. "Squeezing Millimeter Waves into Microns", Physical Review Letters, vol. 92, No. 14, (2004).

* cited by examiner a)

b)

a)

b)

c)

(a)          (b)          (c)

a)

b)

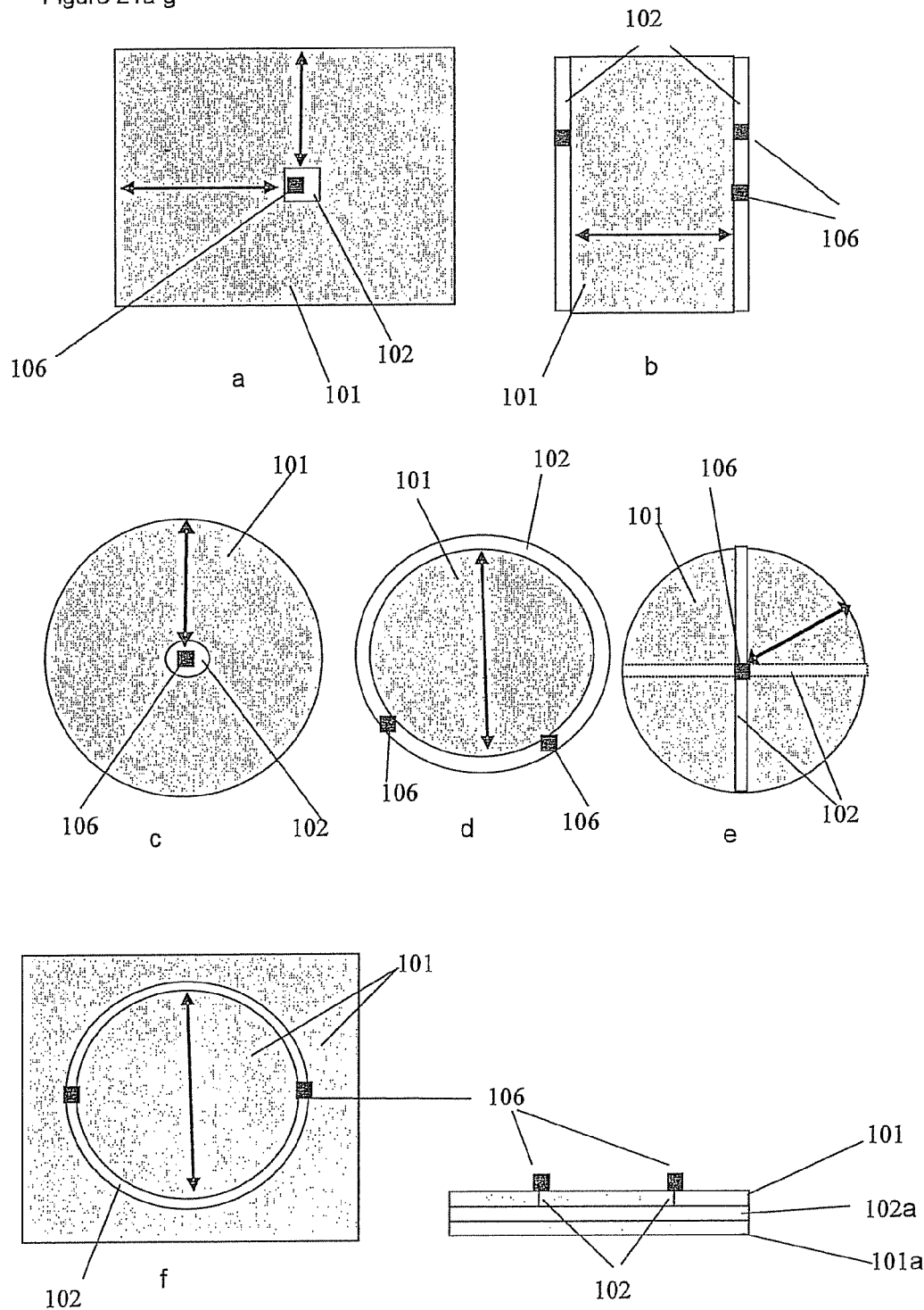
Figure 21a-g

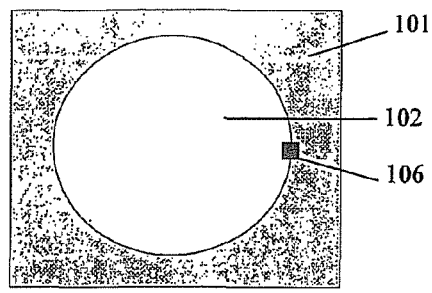
Figure 21g
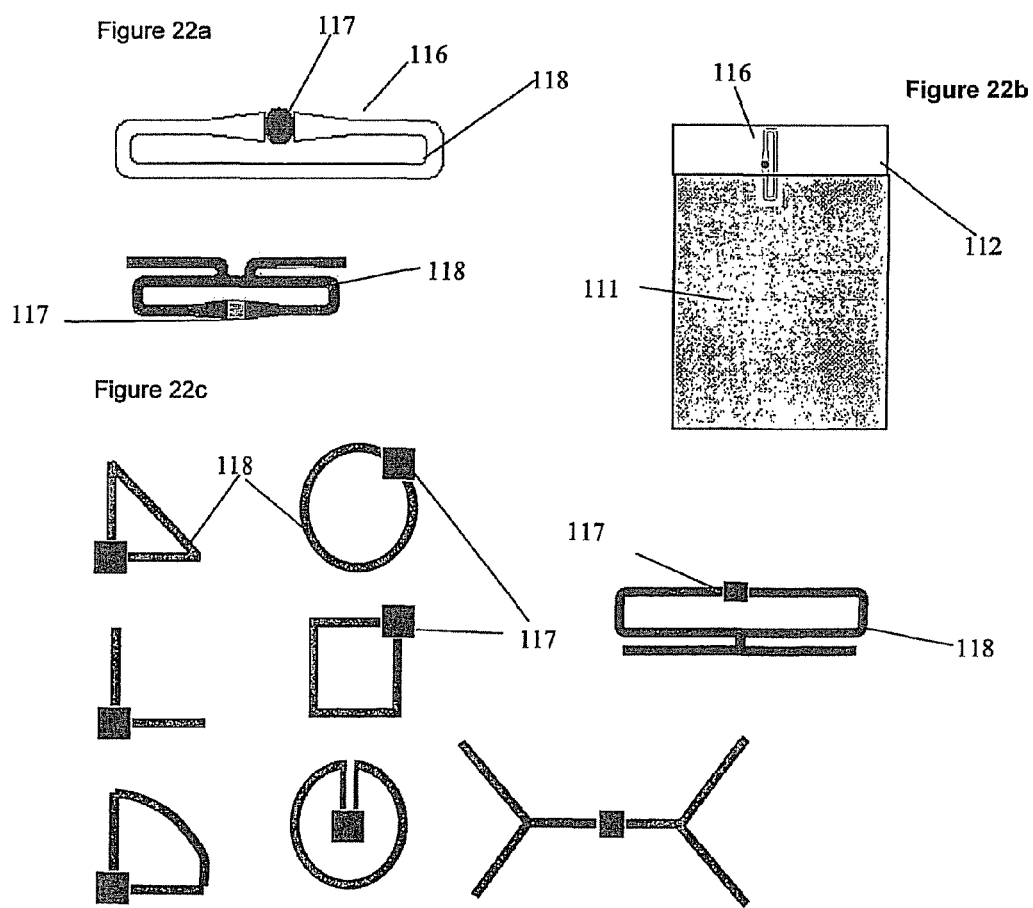

a b

ELECTROMAGNETIC RADIATION DECOUPLER

This is a continuation of U.S. patent application Ser No. 11/474,082 filed on Jun. 23, 2006, now U.S. pat. No. 7,768,400, which in turn claimed priority to each of GB 0512988.7 filed on Jun. 25, 2005; GB 518152.4 filed on Sep. 7, 2005; GB 521945.6 filed on Oct. 8, 2005; and GB 060354.2 filed on Feb. 23, 2006.

FIELD OF THE INVENTION

This invention relates to the field of electromagnetic radiation isolating or attenuating devices and more specifically relates to the field of coupling energy into RF (radio frequency) tags. The invention allows the RF tag to be decoupled (i.e. isolated) from surfaces which degrade tag performance, such as metallic surfaces. The invention relates to any RF tag, particularly those that rely upon propagating wave interactions (as opposed to the inductive coupling exhibited by magnetic tags), Hence our preferred embodiment involves application to long-range system tags (e.g. UHF-range and microwave-range tags).

DESCRIPTION OF THE PRIOR ART

RF tags are widely used for the identification and tracking of items, particularly for articles in a shop or warehouse environment. One commonly experienced disadvantage with such tags is that if directly placed on (or within a several millimetres of) a metal surface their read range is decreased to unacceptable levels and—more typically—the tag cannot be read or interrogated. This is because a propagating-wave RF tag use an integral antenna to receive the incident radiation: the antenna's dimensions and geometry dictate the frequency at which it resonates, and hence tailor the frequency of operation of the tag (typically 866 MHz or 915 MHz for a UHF (ultra-high frequency) range tag and 2.4-2.5 GHz or 5.8 GHz for a microwave-range tag). When the tag is placed near or in direct contact with a metallic surface, the tag's conductive antenna interacts with that surface, and hence its resonant properties are degraded or—more typically—negated. Therefore, the tracking of metal articles such as cages or containers is very difficult to achieve with UHF RF tags and so other more expensive location systems have to be employed, such as GPS.

UHF RFID tags also experience similar problems when applied to certain other surfaces which interact with RF (radio frequency) electromagnetic waves, such as, certain types of glass and surfaces which possess significant water content, examples including certain types of wood with a high water or sap content. Problems will also be encountered when tagging materials which contain/house water such as, for example, water bottles, drinks cans or human bodies etc.

One way around this problem is to place a foam spacer between the RF tag and the surface, preventing interaction of the antenna and the surface. With currently-available systems the foam spacer typically needs to be at least 10-15 mm thick in order to physically distance the RF tag from the surface by a sufficient amount. Clearly, a spacer of this thickness is impractical for many applications and is prone to being accidentally knocked and damaged.

Other methods have involved providing unique patterned antennas which have been designed to impedance match a particular RF tag with a particular environment. For example, International patent application WO2004/093249, WO 2004/093246 and WO2004/093242 to Avery Dennison attempts to deal with this problem by using tags having antennas with compensating elements. The antenna is designed with surface effects in mind and is tuned to a particular environment or range of possible environments. This avoids the need for a large spacer but does require relatively complicated antenna designs which must be impedance matched and hence different for each tag, therefore adding to the cost and complexity of manufacture.

SUMMARY OF THE INVENTION

It is therefore an object of the invention to provide a mount for an RF tag which acts as an electromagnetic radiation decoupler material which mitigates at least some of the problems associated with prior art systems, namely those of thickness, size and flexibility.

In a first aspect of the invention there is provided a radiation decoupler for an electronic device said decoupler comprising at least one dielectric layer sandwiched between at least one first conductor layer and at least one second conductor layer, wherein the at least one first conductor layer has at least one area of absence where the first conductor layer does not overlie the dielectric layer and the decoupler is adapted such that, in use, an electromagnetic field is enhanced in the vicinity of the area of absence of the first conductor layer.

Preferably the length of the second conductor layer as at least the same length as the first conductor layer. More preferably the second conductor layer is longer than the first conductor layer.

According to a further aspect of this present invention there is provided a radiation decoupler for RF tags, for decoupling radiation from a surface in a wavelength range $\lambda_{min}$ to $\lambda_{max}$ comprising a dielectric layer sandwiched between first and second conductor layers wherein the first conductor layer comprises two or more islands separated by at least one aperture of sub-wavelength dimension, wherein the resonant frequency of the decoupler is selected to substantially match the resonant frequency of the RF tag and/or RF reader. The aperture is a void or area of absence of first conductor layer material.

Complete electrical isolation between the two or more islands is not an essential feature of the invention. The island on the first conductor layer may be a region of conductor material which is substantially isolated from a neighbouring region of conductor material. Preferably the two or more islands are electrically isolated from each other.

Preferably the electronic device or RF tag is located substantially over the area of absence. The electromagnetic field may also be enhanced at certain edges of the dielectric core layer, therefore conveniently the electronic device may also be located on at least one of the edges of the dielectric core layer which exhibits increased electric field.

By the term at least one area of absence of sub-wavelength dimension it is meant that the area of absence is less than $\lambda_{min}$ in at least one dimension.

RF tags may be designed to operate at any frequencies, such as for example in the range of from 100 MHz up to 600 GHz. In a preferred embodiment the RF tag is a UHF (Ultra-High Frequency) tag, such as, for example, tags which have a chip and antenna and operate at 866 MHz, 915 MHz or 954 MHz, or a microwave-range tag that operates at 2.4-2.5 GHz or 5.8 GHz.

Preferably the wavelength of operation of the electronic device will be substantially matched to the fundamental resonant frequency of the decoupler, more preferably the decoupler may provide an enhanced read range for an electronic device in the range of $\lambda_{min}$ to $\lambda_{max}$, such that the wavelength of operation of the electronic device preferably lies within the range of $\lambda_{min}$ to $\lambda_{max}$.

It should be noted that that references to wavelength in this document refer to the in vacuo wavelength unless otherwise specified.

The area of absence may be small, discrete crosses, or L-shapes but more conveniently are slits wherein the width of the slit is less than $\lambda_{min}$. A slit may be any rectilinear or curvilinear channel, groove, or void in the conductor layer material. The slit may optionally be filled with a non conducting material or further dielectric core layer material.

The invention provides for a multi-layer structure that acts as a radiation decoupling device. First and second conductor layers sandwich a dielectric core. Where the first conductor layer contains at least two islands i.e. separated by an area of absence or a slit, preferably the one or more areas of absence is a sub-wavelength area of absence (i.e. less than $\lambda$ in at least one dimension) or more preferably a sub wavelength width slit, which exposes the dielectric core to the atmosphere. Conveniently, where the area of absence occurs at the perimeter of the decoupler to form a single island or where at least one edge of the dielectric core forms the area of absence then said area of absence does not need to be sub wavelength in its width.

It should be noted that the conductor layers do not have to be in direct contact with the dielectric core layer. For example, there may be a thin adhesive or other non conducting material layer separating them.

Any material that has a metallic or otherwise electrically conductive response at the electromagnetic wavelengths of interest can be used as a conductor material in the respective conductor layers. Examples of suitable materials are metals metal alloys, metal composites or carbon. The thickness of such a conductor material must be such that it is at least partially opaque with respect to the utilised frequencies of electromagnetic radiation (this is determined by both impedance mis-match and skin depth calculations which will be known to the skilled man). The thickness of the conductor layer material may be greater than 0.10 microns, and preferably the thickness is in the range of from 0.25 to 5 microns, more preferably in the range of from 1 to 2 microns. The thickness may be increased beyond 5 microns if desired, particularly if this is required in order to ensure that the chosen conductive material provides at least a partially opaque barrier to the target wavelengths. However, any significant increase in thickness may affect flexibility and increase production costs. Clearly, there is no maximum thickness requirement for the second conductor layer. Conveniently, the second conductor layer thickness may be selected from the same range as the first conductor layer. This may be desirable to retain flexibility.

The sum thickness of the dielectric core and first conductor layer of the decoupler structure may be less than a quarter-wavelength in its total thickness, and is therefore thinner and lighter compared to prior art systems. Selection of the dielectric layer can allow the decoupler to be flexible, enabling it to be applied to non-planar or curved surfaces. Conveniently, the decoupler may not be planer and may take the form of a non-planar or curved geometry.

The above aspect of the invention provides for two conductor layers to form the decoupler. However, in cases where the material is to be directly applied to—or form an integral part of—a metallic surface (e.g. a car, container, vessel, body or roll cage) then only the first conductor layer and the dielectric core layer are required since the metal structure itself will act as the second conductor layer as soon as the material forming the first conductor and dielectric core layers is applied to the structure.

Accordingly, a further aspect of the invention provides a radiation decoupler for an electronic device, for decoupling radiation from a conducting surface, said decoupler comprising at least one first conductor layer in contact with at least one dielectric layer, wherein the at least one first conductor layer has at least one area of absence where the first conductor layer does not overlie the dielectric layer and the decoupler is adapted such that, in use, an electromagnetic field is enhanced in the vicinity of the area of absence of the first conductor layer. Preferably the electronic device is an RF tag.

Accordingly a further aspect of the invention there is provided a radiation decoupler for RF tags, for decoupling radiation from a metallic surface in a wavelength range $\lambda_{min}$ to $\lambda_{max}$, comprising a conductor layer in contact with a dielectric layer, wherein the conductor layer comprises two or more islands separated by at least one aperture of sub-wavelength dimension, wherein the resonant frequency of the decoupler is selected to substantially match the resonant frequency of the RF tag and/or RF reader system.

In certain applications the size or footprint of the decoupler is not important, such as for example on a logistics container. However, an increasingly large number of mass-produced and bulk-supplied consumer items are required to be tracked by an RF tag means. Therefore, a decoupler with a smaller footprint is highly desirable, and accordingly there is provided a single island decoupler for RF tags for decoupling radiation from a surface in a wavelength range $\lambda_{min}$ to $\lambda_{max}$, said decoupler comprising a dielectric layer sandwiched between a first and second conductor layers wherein the first conductor layer comprises at least one area of absence located substantially at a point on the decoupler which corresponds to an increased electromagnetic field, wherein the electronic device such as, for example, a transceiver is located substantially on the area of absence, and further wherein the resonant frequency of the decoupler is selected to substantially match the resonant frequency of the RF tag and/or a RE interrogating source.

The length G of the first conductor layer may be determined by $\lambda \approx 2$ nG, where n is the refractive index of the dielectric, and $\lambda$ is the intended wavelength of operation of the decoupler. Clearly this is for the first harmonic (i.e. fundamental) frequency, but other resonant frequencies may be employed.

Conveniently it may be desirable to provide a decoupler with length G spacings that correspond to harmonic frequencies other than the fundamental resonant frequency. Therefore the length G may be represented by $\lambda \approx (2 \text{ nG})/N$ where N is an integer (N=1 indicating the fundamental). In most instances it will be desirable to use the fundamental frequency as it will typically provide the strongest response.

Furthermore, it will be clear that where a dielectric core layer is formed from a composite of two or more components that the refractive index n may be considered to be that of a relative refractive index of all the component parts which are located between the first and second conductor layers. The almost equal to sign is used as the formula may deviate when areas of absence or slit widths are substantially larger than sub wavelength in their dimension when they separate two or more islands.

For situations where a larger area decoupler may be used i.e. 2 or more island decouplers as herein defined; in these instances the area of absence may take the form of discrete crosses, L-shapes or more conveniently slits. The slit may be a linear area of absence which may extend part, all or substantially all across the width and or length of the decoupler. When the slit extends fully across the decoupler it may produce two or more electrically isolated islands (i.e. there is no conducting path between the two regions, although there is a commonly-experienced electromagnetic field). However, if the slit does not extend fully i.e. it extends either part or substantially all across the surface of the decoupler then the islands may be electrically joined at the ends of the slits. Complete electrical isolation between the two or more islands is not an essential feature of the invention.

In one embodiment the invention provides a broad band decoupler, which is a decoupler which may operate at more than one resonant frequency. In this embodiment the decoupler further comprises a third conductor layer adjacent a second dielectric layer wherein third conductor layer has at least one area of absence where the third conductor layer does not overlie the second dielectric and wherein the second dielectric layer is located between the third conductor layer and the second conductor layer. To achieve a broad band decoupler preferably the first conductor layer is different to the length of the third conductor layer. Such a broad band decoupler could be arranged, say, to operate at the common operating frequencies of RF tags. Any of a number of different RF tags could be mounted at the appropriate point on the decoupler and operate successfully. Additionally in use, two different electronic devices, such as RF tags, each of which has a different operational frequency may be located on the appropriately tuned first or third conductor layer. Each tag would be decoupled from surface effects and could be read individually at the correct operating frequency. If required there may be further conductor and dielectric layers to form a decoupler capable of operating at a plurality of different wavelengths.

In an alternative arrangement there may be provided at least one first conductor layer and at least one dielectric layer located on both the upper and lower surfaces of a second conductor layer, in other words both sides of the second conductor layer carry a dielectric layer and a further first conductor layer. The first conductor layers are mounted on opposing sides of the second conductor layer. The first conductor layers may or may not be the same length.

In one embodiment at least one area of absence or slit may be substantially non parallel to at least one of the edges of the decoupler. This will provide a decoupler which has a first conductor layer with a plurality of different period lengths, such that it may function at a plurality of wavelengths. Thus the use of a non-linear area of absence or non-linear slit or alternatively an area of absence or slit which is linear but is lies non-parallel with respect to one or more of the edges of the decoupler will allow an increased wavelength range of operation. This may be used in combination with the multiple layer broad band decoupler embodiment as hereinbefore defined. The same effect may also be achieved with a non-linear slit or area of absence.

In use the decoupler may be located on any surface and may offer advantages as compared to the use of no decoupler, as will be described. The decoupler is clearly of use on surfaces, which due to electrical interactions within or substantially on the surface of the material, would otherwise have a detrimental effect on the operation of the RF tag's own antenna.

The decoupler will allow RF tags which are correctly located in the vicinity of the first conductor layer to operate on or in near proximity to surfaces which are either non-reflective or reflective to incident RF radiation since the decoupler effectively acts as a barrier against the further propagation of electromagnetic radiation. The advantages of the invention are apparent on surfaces which are reflective or have an effect on incident radiation which is detrimental to the receipt thereof by an electronic device. Typically such RF reflective surfaces may be conductive materials, materials which comprise high liquid content or surfaces which form part of a containment means for such a fluid. It has been found that certain types of glass interact with RF tags and so the decoupler may also find use on glass, silica or ceramics.

The containment means for a fluid may be any barrier, membrane or part of a container which separates a fluid on one side of the surface with a different environment on the opposing side of the surface. The opposing side of the surface may preferably be an external surface on which the decoupler is located; preferably the containment means is part of a container and may be a food, drink, or chemical container. The decoupler may be mounted on the surface or containment means or alternatively the surface or containment means may form an integral part of the decoupler, such as for example for a non conducting surface or non conducting containment means may comprise in part the dielectric layer. Alternatively for a conducting surface or conducting containment means the surface or container may in part form the second conductor layer.

Typical RF reflective conductive materials may be carbon, metal, metal alloys or metal composites. The RF reflective material may also be a liquid or alternatively a material which comprises a high liquid content such as a cellulose material, for example, certain woods, card, paper or any other naturally occurring materials which may possess high moisture content.

Therefore, the decoupler may be applied to surfaces which are in environments or areas of high humidity, damp or even to surfaces which are partly or completely submerged beneath the surface of a fluid, such as for example a liquid such as water. Therefore the decoupler and RF tag may be located either on the outside or inside, with appropriate encapsulation, of a drinks or food container.

The four island decoupler has advantageously been found to enable an RF tag located thereon to provide a readable tag when the decoupler and RF tag have been completely submerged in a water tank. An RF tag which is not located on a decoupler will not provide any read range when submerged. This has particular advantage in applications such as underwater construction or oil and gas construction, such as pipe identification such that components may be readily identified by an RF system. Clearly, the decoupler will find use in systems where there is an RF reflective environment and visual identification is impaired or not available.

The surface may form an integral part of a containment means for a fluid. It is known that liquids such as water interfere with RF radiation and hence detrimentally influence the performance of RF tags in their vicinity. Therefore the surface may be that of a food, drink or chemical container.

The decoupler may be used on surfaces which are made from materials which contain/house water such as water bottles, drinks cans, food containers or human bodies etc. Furthermore the tagging system may be applied directly or indirectly to persons or animals to track their whereabouts or movement through a particular area, a particular example may be people especially vulnerable persons such as, for example, children or babies in a hospital environment. A further use is to use the metallic layer of optical discs (CDs and DVDs) as the second conductor layer and the dielectric substrate of the optical disc as the dielectric core layer and hence a first conductor layer may be located on the substrate (distal to the metallic layer) to create an integral decoupler. A low Q RE tag may then be located in the vicinity of the area of absence of the first conductor layer.

The decoupler and RF tags have further been found to be active when placed inside metallic coated bags, such as anti-static bags. This will advantageously allow computer components or the like to be tracked without removal of the component from the protective bag. Further examples of environments where the decoupler has found use are within snow or ice, within concrete structures and frozen animal carcasses.

The decoupler may be applied to surfaces which are linear or substantially flat, or surfaces which are singly- or doubly-curved, such as for example cylinders or spherical surfaces, respectively. Thus, the invention facilitates the production of food and or drinks containers with RF tags rather than barcodes. The decoupler may be applied to cylindrical containers (e.g. food and drinks cans) such that their whereabouts within a controlled environment may be located by the use of RF ID tracking technology.

It will be clear that the use of the decoupler for RF tags is not limited to tracking items, and that it may be used for any purpose that would suit the use of RF tags, such as for example point of sale, smart cards, identification of vehicles, tolls etc.

The following discussion applies to both aspects of the invention, namely whether the decoupler is provided with a discrete second conductor layer or the surface of the article to which the RF tag is applied acts as the second conductor layer of the decoupler.

One explanation for the mode of operation which does not limit the scope of the invention may be that the RF tag is a resonating circuit and the decoupler can be seen as a different resonating circuit. Were the RF tag electrically connected to the decoupler, i.e. were the decoupler acting as an antenna, there would be a very poor transfer of energy as the two systems would not generally be impedance matched. However, as there is no electrical contact there is no impedance issue. The decoupler is acting as a surface independent field enhancer in the vicinity of the tag—the energy is coupled into the trapped standing wave. As long as the tag is located in the area of high electric field the tag will then efficiently couple to the radiation itself. The decoupler of the present invention therefore works with any tag design operating at a particular frequency and does not require a separate design for different tags, unlike prior art tuned antenna systems.

Other means of focusing or directing energy to create regions of high energy may also be envisaged.

Conveniently, the thickness of the decoupler (i.e. typically the sum thickness of the first conductor layer and dielectric core layer) is far less than a quarter-wavelength of the incident radiation. For example, radiation will undergo interaction with the decoupler in the instances where the thickness is equivalent to a less than $1/10^{th}$, preferably less than $1/100^{th}$, more preferably less than $1/300^{th}$ or even a few $1/1000^{th}$, and it may also be desirable to use less than $1/3000^{th}$ or even $1/7000^{th}$ of the wavelength of the incident radiation For example, a frequency of 866 MHz corresponds to a wavelength of 346 mm in vacua, and hence 50 micron PETG decouplers would constitute devices that were approximately $1/7000^{th}$ of a wavelength thick. Typically prior art antenna systems rely on several millimetres of thickness to achieve any degree of surface independence.

As described above, the first conductor layer of the decoupler may comprise one or more slits or area of absence, such as—for example—decouplers exhibiting 2 or more islands.

The arrangement of slits on the first conductor layer affects the wavelength or wavelengths of radiation that can interact with the structure. Preferably the slit arrangement is periodic.

In one embodiment the slit arrangement comprises parallel slits. It has been determined that, with a parallel slit arrangement, radiation of wavelength λ may undergo decoupling according to the following relationship:

$$\lambda_N \approx 2\,nG/N$$

where $\lambda_N$ is the wavelength in the range $\lambda_{min}$ to $\lambda_{max}$ where maximum decoupling occurs, n is the refractive index of the core, G is the slit spacing and N is an integer ($\geq 1$). Our preferred embodiment utilises the case where N=1, which will be denoted to be the first harmonic (i.e. fundamental) mode. Note: for decouplers comprised of two or more islands, the slits may be narrow in comparison to the wavelength. It is further presumed that the radiation is linearly polarised such that the electric field vector is orientated perpendicular to the axis of the slit (i.e. its length): by definition typical to this field of research, if the plane of incidence is parallel to the slit then the radiation must be TE-(s-)-polarised (electric vector perpendicular to the plane of incidence); if the plane of incidence is perpendicular to the slit then the radiation must be TM-(p-)-polarised (electric vector within the plane of incidence). It will be clear to any person skilled in the field of electromagnetics that the devices will also work with electromagnetic radiation of elliptical or circular polarisation since this will exhibit a suitably aligned component of electric field.

It can be seen from the above relationship that the wavelength of radiation that is decoupled is linearly related to the slit spacing G and the refractive index of the dielectric core layer. Varying either of these parameters will enable a specific wavelength to be decoupled by the structure. For a single island decoupler the above equation also applies with G representing the length of the first conductor layer.

It can also be seen that radiation will also be decoupled at a number of wavelengths corresponding to different values of N. Each of the frequencies comprises a resonant frequency of the decoupler as the term is used herein. However, the resonant frequency of the tag preferably matches the first resonant frequency of the decoupler that is the resonant frequency at N=1. Clearly, the other harmonic frequencies may also be used to provide decoupling.

The above equation is an approximation that is most accurate when the thickness of the dielectric core layer is equal to the width of the slit, and when this thickness value is greater than approximately a millimetre. If the slit width is decreased then there is a gradual shift of the resonance to longer wavelengths (the exact shift being related to the ratio of slit width and core thickness). It is also generally true that an increase in the dielectric core layer's thickness, either uniformly or in discrete regions, will tend to increase the resonant wavelength, and vice versa.

It should also be noted that only odd values of N give rise to resonances if the radiation is made incident upon the structure at normal incidence.

The decoupler may comprise at least two metallic islands separated by one area of absence. In one embodiment the RF tag may span the area of absence such that the chip on the tag is substantially centrally located over the area of absence and the antenna is located over the at least two metallic islands. The islands may be any geometric shape, but preferably the islands are square or rectangular in shape. However, advantages with regard to—for example—polarisation insensitivity may be obtained via the use of other polygons, such as triangular, hexagonal or circular islands.

The length of a metallic island (such as, for example, G in the previously stated equation) may be selected depending on the operational wavelength of the RF tag employed. The length of the island multiplied by the refractive index of the core material is selected as being approximately half of the operational wavelength of the RF tag. Some commercially available RF tags, such as, for example, a tag manufactured by Alien Technology, exhibit antennas that are of a length that is comparable (e.g. one-third or greater) to their wavelength of operation. This places a lower limit on the length of a typical decoupler since it is usually convenient for the device to mechanically support the tag (i.e. it is often convenient that the decoupler is no smaller than the tag that it supports). It is hence desirable that smaller tags could be identified for use on the decouplers, as hereinafter defined.

The width of a conductor layer metallic island may be determined by the dimensions of the selected RF tag. As an example only, for commonly used UHF RE tags the width of the island has been used at 4 to 5 times the width of the tags. However, where less obtrusive decouplers and tags are required, the width of the decoupler may be reduced such that it is at least the width of the chip and antenna. A reduction in decoupler width will tend to decrease the read-range of the RF tag, and vice versa.

Preferably the width of the area of absence, and both the permittivity and thickness of the dielectric core material will be selected to provide a decoupler which has a resonant frequency substantially the same as that of the RF tag.

Power is dissipated by both the dielectric core and to a certain degree—the first and second conductor layers that are located on said dielectric core, and hence the permittivities and permeabilities of these materials are important parameters in the design process.

One way in which to remove dependency on the azimuthal orientation of the decoupler relative to the incident radiation, is that the first conductor layer preferably comprises at least one orthogonal set of slits (a "bi-grating" arrangement). This may provide the advantage of reducing polarisation-dependent effects exhibited by a single slit array (a "mono-grating" arrangement) for which only one linear polarisation may be decoupled for any orientation (namely the polarisation state with the electric field component perpendicular to the slit direction). However, it will be clear to the skilled person that any orientation such that a component of the incident electric field crosses the slit perpendicularly will give rise to a certain degree of functionality (i.e. decoupling will occur at any orientation other than with the slit parallel to the electric polarisation vector, although the read-range will be greatly reduced as the sample is rotated towards this orientation). The bi-grating arrangement, however, decouples both polarisations since it will always exhibit a suitably aligned slit for a component of the electric polarisation vector.

In a further arrangement there may be three sets of slit arrangements at 60 degree azimuthal separation (i.e. forming a triangular pattern). Higher order patterns, tending to infinity, such as for example circular, are hereinafter defined.

It has been observed that for "wide" slits (i.e. slit width greater than a millimetre for 866 MHz radiation) the decoupling wavelength varies according to the angle at which the radiation is incident to the surface of the first conductor layer. As the slit width decreases then the angular dependency becomes less pronounced. Therefore, in a preferred embodiment the slits are smaller than the wavelength of radiation to be decoupled.

For wavelengths λ corresponding to and in close proximity to the microwave region of the electromagnetic spectrum (e.g. λ's generally in the range millimetres to metres) then typically slit widths or area of absence are less than 1000 microns and preferably less than 500 microns and more preferably less than 150 microns and may be less than or equal to 50 microns. It is therefore desirable for other wavelength regions that the area of absence may be less than $\frac{1}{50}^{th}$ or more preferably less than $\frac{1}{100}^{th}$ of the wavelength of incident radiation.

The dielectric core layer material may be any suitable or commonly used dielectric material, but preferably the material for dielectric core layer will not be lossy (i.e. the imaginary components of the complex permittivity and permeability may be optimally zero. The dielectric core layer may be a void between the first and second conductor layers, such as for example a partial vacuum or a gas such as in part or substantially an air gap between the first and second conductor layers. Conveniently, cores using a void may in part be reinforced by using non-electrically conducting materials between the conductor layers, such as, for example, corrugated cardboard, honeycomb structures or foams which possess a high void content.

Dielectric core layer materials may be selected from polymers such as, for example, PET, polystyrene, BOPP, polycarbonate and any similar low-loss RF laminates. Commonly-used container materials which may form part or substantially all of the dielectric core layer may be cellulose materials such as paper, card, corrugated cardboard, or wood. Alternatively, certain ceramics, ferrites or glasses may be used.

In one embodiment the material chosen to be used in the dielectric core layer has a refractive index that can be controllably varied in order to control the wavelengths of radiation that are to be decoupled. For example, a polymer dispersed liquid crystalline (PDLC) material can be used as the core. If the decoupler structure is arranged such that a voltage can be applied across the dielectric core layer material then its refractive index can be altered and the decoupled wavelengths will shift in a tailored manner. This may be particularly advantageous as one decoupler may then be used for a range of RF tag wavelengths, or controlled such that the decoupling action may be switched on and off.

Further, if the object to which the decoupler is to be attached requires different RF tags for different locations (e.g. different countries) then a dielectric core layer material with a tuneable refractive index would allow the same decoupler to be used for RF tags which operate at different wavelengths. Alternatively, the decoupler may be prepared such that it has different regions which contain different pitch lengths or periods, which may decouple commonly used RF tag frequencies/wavelengths, such as for example 866 MHz, 915 MHz, 2.4 to 2.5 GHz and 5.8 GHz. The decoupler may have one or more regions comprising different periods suitable for different resonant frequency RF tags.

RF tags generally consist of a chip electrically connected to an integral antenna of a length that is generally comparable with (e.g. $\frac{1}{3}^{rd}$ of) their operational wavelength. The present inventors have surprisingly found that RF tags having much smaller and untuned antennas (i.e. which would not normally be expected to operate efficiently at UHF wavelengths) can be used in conjunction with a decoupler according to the present invention. Usually tags with such 'stunted' antennas (hereinafter referred to as low-Q antennas, as will be appreciated by one skilled in the art) possess only a few centimetres or even millimetres read range in open space. However, it has surprisingly been found that using such a tag with a low-Q antenna mounted on a decoupler of the present invention may be operable and exhibit useful read ranges approaching (or even exceeding) that of an optimised commercially-available RF tag operating in free space without a decoupler. Low-Q antennas may be cheaper to manufacture, and may occupy less surface area (i.e. the antenna length of such a tag may be shorter than is usually possible) than a conventional tuned antenna. In a particularly preferred arrangement, therefore, an RF tag with a substantially reduced antenna area/length may be mounted onto a decoupler according to the invention. Preferably A low Q RF tag may be mounted on a single island decoupler as hereinbefore defined, to provide a reduced area decoupler and tag system, which may have a first conductor layer length of substantially $\lambda \approx 2$ nG/N, where $\lambda$ is the wavelength in the range $\lambda_{min}$ to $\lambda_{max}$ where maximum absorption occurs, n is the refractive index of the dielectric, G is the period of the at least one first conductor layer and N is an integer greater than or equal to 1.

The RF tag and its integral antenna are usually mounted or printed onto a dielectric substrate, the dielectric substrate may be placed directly in contact with the surface of the decoupler. Preferably there may be a further dielectric material, defined to be a spacer, may be placed between the RF tag and the decoupler material. When a spacer is present the length and width dimensions of the spacer must be at least the same as that of the metal areas (for example, antennas) of the RF tag. Most RF tags are supplied already mounted on their own substrate, which varies in thickness depending on the manufacturer. The antenna of the RF tag must not be in direct electrical contact with either the first or second conductor layers.

Preferably the (total) gap between the metal part of the RF tag and the decoupler (i.e. spacer thickness+RF tag substrate thickness) is less than 2000 microns, preferably in the range of from 100 to 1000 microns, preferably of from 175 to 800 microns, more preferably of from 175 to 600 microns. These values may differ if a spacer or tag substrate exhibiting lossiness or an unusually high or low refractive index is used (i.e. if something other than a standard polymer substrate such as a PET is used). Similarly, a shift to higher or lower frequencies of operation may affect spacer thickness. The spacer may not be required where there are other means of locating the RF tag at a fixed distance from the first conductor layer. It will be appreciated that there may still be a degree of electric field present beyond 2000 microns, however it may not be particularly desirable.

It has been has shown that the electric field is a maximum in the area of absence and falls off exponentially with increasing distance above the plane of the decoupler. One explanation of the role of the spacer, which does not limit the scope of the invention is that with no tag present the decoupler resonates as expected. However, as the tag is introduced it interacts with the decoupler and begins to perturb its resonance. The degree of perturbation increases as the tag gets closer to the decoupler surface. Eventually the degree of perturbation becomes so great that the resonance and hence the region enhanced field that belies the operation of the decoupler is no longer created. Thus the spacer is a way of compromising between exposing the tag to maximum electric field and not perturbing the decoupler so much as to destroy the decoupling mechanism. Therefore, it would be clear that although any RF tag may be located at a total distance between 100 to 1000 microns, as hereinbefore defined and provide a very useful read range. However, it will be clear that simple distance measurements may provide the preferred distance for a given RF tag from the surface of a given decoupler, which may further increase the read range of the RF tag.

The metal antennas of RF tags may be easily deformed or scratched by normal handling. Advantageously the RF tag and decoupler may be in part covered or enveloped by a protective housing. The housing may be a non-conducting material deposited on the surface of the RF tag and the decoupler. The non-conducting material may simply be further dielectric material applied—for example—via spin coating techniques, depositing materials such as for example PET, PETG UPVC, ABS or any suitable potting compound, such as, for example, an epoxy etc. It has been found that such housing coatings in the range of from 250-2000 microns and even up to 5000 microns do not affect the read range of RF tags. Clearly the thickness of the housing will be selected depending on the environment and the flexibility required from the tag.

The conductor layers, which form the decoupler, may be manufactured by any known process, such as: etching of a metal-coated dielectric surface, photolithography, use of conductive inks such as carbon or high-loaded silver inks, deposition of block foils (such as by hot stamping), vapour deposition (optionally etching afterwards), adhered metal foils, or the use of catalytic inks in combination with a pattern transfer mechanism for additive electroless deposition and optionally electrodeposition.

Accordingly, in a further aspect of the invention there is provided a method of making a decoupler according to the invention comprising the steps of coating a dielectric material with an ink composition in a pattern according to the invention, wherein said ink composition comprises an ink formulation suitable for printing the substrate to be coated, silver as a reducible silver salt and filler particles, wherein said reducible silver salt is selected such that when reduced is capable, once the coated substrate is introduced into an autocatalytic deposition solution, of catalysing the deposition of a metal from the autocatalytic deposition solution, onto the coated areas of the substrate, and wherein the proportion of the reducible silver salt is such that the ink composition contains less than 10% by weight of silver, optionally subjecting said coated area to electrodeposition. Conveniently an ink and or method may be used such as that disclosed in pending Patent Application number GB0422386.3.

The ink formulation may be deposited by any known pattern transfer mechanism, such as, for example, ink jet, gravure, flexo or screen printing techniques. The deposited ink may then be subjected to standard electroless deposition techniques for autocatalytic deposition. It may be desirable to increase further the thickness of the electrolessly deposited metal by using electrodeposition, which may be achieved by a reel to reel process.

As an example a metal food container may act as the second conductor layer, to this may be applied a thin coat of dielectric material to form the dielectric layer. The first conductor layer may then be deposited by any known means into the desired decoupler pattern on the dielectric core layer material. There may optionally be a further dielectric applied to create a spacer material. The RF tag may be located over the area of absence or aperture and optionally a protective housing printed or applied over the tag and or decoupler. The protective housing may comprise the finished coloured design for the item being sold. It may be desirable that the decoupler is located in a recess within the surface of the metal food container, such that the final decoupler and RF tag are flush to the surface of the container. It will be clear that the first conductor layer must be electrically isolated from the conducting material of the metal food container. This may easily be achieved by ensuring that the first conductor layer does not go to the very edge of the decoupler or by using a non conducting protective housing.

In an embodiment of the invention the decoupler can be constructed such that it is flexible. If it is backed with an adhesive material then it can be applied to any surface of interest in the form of a tape or appliqué film. The ability to construct a very thin decoupler (relative to the wavelength of radiation to be decoupled) means that it can effectively be moulded to any surface contour. Where the second conductor layer is provided by a metallic surface or article to which the decoupler is to be applied, then the first conductor layer and dielectric layer may be adhered to said metallic surface, by means of an adhesive located on the dielectric layer.

A further aspect of the invention provides an RF tag mounted on the surface of a decoupler as hereinbefore described.

There is further provided a substantially surface independent RF tag comprising an RF tag mounted on a decoupler as herein before defined. It may be advantageous to mount more than one RF tag onto the area of absence, such as to in a stacked arrangement. The decoupler has been shown to work with both Gen 1 and Gen 2 protocol tags. Therefore if different recipients use different protocol tags they can be mounted on the same decoupler optionally in the same area of absence in a stacked arrangement. Clearly RF tags may be the same protocol and so may merely provide different identification purposes for the users.

In a yet further aspect of the invention there is provided a surface wherein a proportion of the surface is partially, substantially or completely covered in a decoupler or a surface independent RF tag as hereinbefore defined.

There is further provided a body or container which comprises at least one surface as hereinbefore defined. In one embodiment the at least one surface may be curved. In a further preferred embodiment said body or container may be a logistics container such as for example a rollcage, stillage, or food or drinks container, and particular examples may be drinks cans or canned food.

In a further aspect of the invention there may be provided a decoupler according to any one of the embodiments described above wherein the dielectric layer may be formed from in part or substantially all of a non conducting containment means. Particularly preferred material for the non conducting containment means may be natural or man made fibres, plastic, cellulose, glass or ceramic. In this arrangement a container such as bottle or carton made from a non conducting material, such as plastic or card may form in part the dielectric layer. Therefore a first conductor and second conductor layer may be formed by any means hereinbefore defined on either side of said container, such that the conductor layers are co-located to form a decoupler according to the invention. It may be convenient to use a further dielectric material on one or both sides of the non conducting containment means (i.e. forming a multilayered dielectric core), such as to improve the dielectric nature of the dielectric core.

The dielectric core of the decoupler may also be formed using in part or all of a non-conducting label or covering for an article to be tagged.

Decouplers which possess one or more slits or areas of absence and which are used with RF tags which possess directional antennas (i.e. antennas that preferentially interact with linear polarisation of a specific orientation) may only achieve large enhanced field effects when the reader and the tag mounted on the decoupler are substantially parallel. This may be mitigated by using transmitter/receiver systems which utilise circular or elliptical polarisations, or multiple and differently-aligned antennas. Alternatively, in a further aspect of the invention, there is provided a polarisation independent decoupler, such that the position and subsequent activation of the RF tag on the decoupler is independent of the polarisation or orientation of the incident radiation. Accordingly, the area of absence of the first conductor layer comprises at least one non-linear area of absence, preferably a substantially curved or more preferably circular patterned area of absence or yet further preferably a circular slit may be formed in the first conductor layer. Triangular, hexagonal or other polygonal island shapes may also be utilised.

As a yet further aspect of the invention there is provided a metallic container wherein a proportion of the surface of the container is covered in a decoupler or surface independent RF tag as hereinbefore defined.

The type of logistics container (e.g. rollcages, stillages, etc) are just generic names for wheeled caged containers used for the transport of goods in the logistics chain. These are found in all types of logistics, typically supermarkets, post office, courier, airlines or dairies etc. It will be apparent that any logistics container or item to be tracked may be fitted with a tagging system comprising a surface independent RF tag as herein defined, such as, for example, pallets, shipping containers, supermarket trolleys or baskets, hospital beds and/or equipment, items of clothing, animals, humans, food and drink containers.

As an example, logistic containers such as rollcages typically carry an identification plate, which usually displays barcode or visual indications i.e. written/typed identification means. As mentioned above, previous decouplers for RFID which have used thick foam spacers have also been mounted on the identification plates, but these devices protrude from the surface of the plate and are prone to being knocked and accidentally removed from the plate.

A further aspect of the invention provides a logistics container, for example a rollcage comprising a decoupler or a tagging system according to the invention. There is further provided an identification plate comprising a recessed portion, said portion comprising a tagging system as hereinbefore defined, and a protective layer to produce a substantially flush identification plate. The protective layer may be selected from the same range of material as the protective housing as hereinbefore defined. In this embodiment the protective layer may replace the requirement for the protective housing. It has been found that such protective layer coatings in the range of from 250-2000 microns, and even up to 5000 microns, do not affect the read range of RF tags. The protective layer may be applied as a liquid, such as, for example, a potting compound which may be cured to "pot" the components, or alternatively the protective layer may be applied as a film or sheet which is inlaid into the identification plate.

The advantage is that the tagging system (i.e. the decoupler and RF tag) is located beneath the surface of the identification plate to provide further protection to the components, such as for example from environmental hazards such as for example adverse weather and also from collision hazards and scratches. The identification plate comprising the tagging system may then be welded or riveted directly to the logistics container or roll cage. This provides a useful solution in that the decoupler becomes an intrinsic part of the logistics container or roll cage.

The identification plate may be manufactured from any suitable material, such as metal or their alloys therein, laminates, plastics, rubbers, silicones, or ceramics. If the plate is manufactured from a conducting material, then the metallic elements of the decoupler (other than the substrate) must be electrically isolated from the plate. It should be noted that the plate—if metallic—may provide the substrate layer of the decoupler, as previously described.

A yet further advantage is that the identification plate comprising the tagging system may have a further identification means applied, such as the traditionally-used identification means, such as, for example, a barcode or visual indications (i.e. written/typed identification means). This allows the gradual integration of the RF tracking system into a working environment or allows different companies to monitor the logistics containers by different tracking methods.

In yet a further aspect of the invention, there is provided a metallic body or container comprising a recessed portion within a surface of said body or container, said recess comprising a decoupler as herein which is before defined electrically isolated from said surface and at least one RF tag located on said decoupler and optionally a protective layer to envelope said decoupler and RF tag, such that said decoupler and RF tag are at least flush with the surface of said body or container. Where the metallic body or container provides the second conductor layer, the decoupler must be designed so that the first conductor layer is not electrically connected to the metallic body or container. For example, commonly used drinks cans and food cans may have a simple indentation formed in their surface to accommodate a decoupler so as to allow the can to remain aesthetically pleasing. An advantage of RFID in the retail industry is that the item(s) may all be scanned in one pass through a reader, reducing the burden of scanning individual items into an electronic point of sale register. A further advantage of using a recess design is that the tag could not be easily removed from the item. This would reduce the chances of untagged items being present in a shopping trolley or basket. The recessed decoupler design may also be used in a non conducting container or body, however there is no requirement for electrical isolation of the first conductor layer from the container or body.

There is also provided a method of tracking a body or a container comprising the steps of applying to a proportion of the surface of said body or container a decoupler or a tagging system as hereinbefore defined, interrogating the at least one RF tag with RF radiation, and detecting the response from the at least one RF tag. The body or container may be manufactured from any suitable conducting material, as hereinbefore defined.

A relatively inefficient decoupler (in comparison to previous examples) may be made by using a commercially available double sided PCB blank, that is one with conductor layers on both sides of the board. The board may then be cut to a length which is approximately half the wavelength of the incident radiation. In this set up the area of absence may be considered to be the exposed dielectric core. An RF tag may then be placed on the edge of the side of the board, such that the RF tag is orthogonal to the board. Therefore, decoupling from a metal surface may be provided by this method if a restricted read-range is sufficient.

Commercially available tags which can be read in free space may have antennas in the order of 10 cm, and may not be suitable for identifying many of the small samples commonly found in laboratories, whether medical, chemical or otherwise. The active chip from a UHF tag is of the order of one or two millimetres and therefore may be easily deployed onto a small containers or articles. Alternatively, it may be desirable to place RF tags in discrete or confined areas of a surface or article to be tagged. The UHF chip without the antenna will not function, even if the interrogating system is placed next to the chip. However, when the chip and optional spacer is located on a decoupler as herein defined, the chip may be read on condition that finite metal connections are present to couple power to the chip, even if they are merely metallic stubs. Further, it may not be convenient to place directly a decoupler onto the small container or article. Therefore, in a further aspect of the invention there is provided a method of detection or identification of a surface or article comprising the steps of;

bringing together a surface comprising an RF tag or low Q RF tag, with an optional spacer, into proximity with a decoupler as herein defined, interrogating said RF tag, wherein the RF tag may only be read when in close proximity to said decoupler.

This is particularly useful where an optimally sized decoupler (for communication with a reading device) may not be readily incorporated onto a small body or article.

It may be desirable that the RF transmitter/reader system comprises an integral decoupler. Therefore an advantage is that small bodies which may only have sufficient room on their surface for an RF tag with a low Q antenna, may be successfully interrogated by using a decoupler according to the invention.

For example, the tag and optional spacer may be placed on any small container, vessel, surface or piece of kit to be identified. Possible examples include a medical sample, surgical instrument, a microscope slide, vial or bottle, such that when the surface bearing the RF tag and optional spacer is placed in close proximity to the decoupler then it would be capable of being read by an interrogating device.

In yet a further aspect of the invention there is provided a low Q RF tag wherein the antenna has a major dimension substantially less than 2 cm, more preferably the antenna has a major dimension substantially less than 1 cm.

There is further provided a low Q RF tag suitable for use with a decoupler as herein before defined, wherein said low Q RF tag is optionally mounted on a spacer, preferably the thickness of the spacer and the low Q RF tag together is in the range of from 175 to 800 microns. A further advantage is that the smaller dimensioned single island decoupler may be conveniently used a low Q RF tag, to provide a smaller footprint tagging system.

The advantage of using the Low Q RF tags is that they can be significantly smaller than commercially available RF tags which typically have larger antennas. Therefore, low Q RF tags with minimal antennas in combination with a decoupler as herein defined may be placed more discreetly into documents, and/or credit card sized information documents such as, for example, passports, identification cards, security cards, driving documents, toll cards etc, wherein the plastic of the card or pages of the document form in part the dielectric layer. Therefore the movement of people or goods within controlled zones or through controlled entry points may be facilitated, without requiring direct contact or visible scanning of documents.

A yet further advantage of using low-Q antennas is that they don't operate at a specific frequency, and neither does the chip. Since most readers do not operate at spot frequencies but across a range of frequencies, a US system and a European system can both drive the chip on a decoupler that resonates at a frequency emitted by both interrogators. So for example a decoupler designed to work at 890 MHz (between 866 (EU) and 915 (USA)) and use a low-Q antenna: both systems emit enough 890 MHz radiation to power the chip. A tightly-defined 866 MHz antenna may not work as well with a 915 MHz system, and vice-versa.

In a further aspect there is provided a kit of parts comprising an RE tag with an optional spacer and a decoupler according to the invention.

In a further embodiment it may be desirable to provide increased protection to the RF tag. Accordingly there is further provided a decoupler as hereinbefore defined wherein an RF tag or low Q RF tag is located at least partly within or forms an integral part of the dielectric layer. Where a significantly sized antenna is present, it may extend outside of the dielectric core, but must be electrically isolated from the first and second conductor layers. This has the advantage that the overall thickness of the RF tag and the decoupler or RF tagging system is substantially just the thickness of the decoupler.

As an alternative to creating a surface independent RF tag and locating it directly onto a surface, it may be desirable to form a decoupler effectively in-situ, such that the decoupler functions when the component parts of the decoupler are brought into alignment. Accordingly there is provided a method of forming a decoupler suitable for the detection or identification of a surface comprising the steps of i) providing a surface comprising an RF tag or low Q RF tag with an optional spacer, and at least one conductor layer in contact with part or substantially all of at least one dielectric layer, wherein the at least one first conductor layer has at least one area of absence, wherein the RF tag is located in the area of absence, ii) bringing together the surface of step i) with a second conductor layer or conducting surface to form a decoupler as herein defined. It will be clear that the second conductor layer may optionally comprise a dielectric material upon its surface to form part or substantially all of the dielectric layer. Clearly the RF tag may also be located on the edge of the dielectric layer where the first conductor layer and dielectric ore layer are substantially the same length.

The advantage is that the decoupler may be formed by the act of bringing the component parts into alignment. For example a folded or hinged article, such as a document, box or door etc may be configured such there is a first conductor layer on one side of a fold with a Low Q RF tag and in the second side of the fold a second conductor layer, such that in an open state the book cannot be read, but when closed the pages of a book or contents of the article form the dielectric layer and the first and second conductor layers are brought into alignment such that a decoupler according to the invention is formed and the low Q RF tag may be interrogated and read.

There is further provided a single island decoupler for an RF tag for decoupling said device from a surface comprising at least one dielectric layer sandwiched between at least one first conductor layer and at least one second conductor layer, wherein the first conductor layer is tuned to the resonant frequency of the interrogating radiation, wherein said length G of the first conductor layer is determined by $\lambda \approx 2$ nG, wherein the at least one first conductor layer has one area of absence at, at least one edge, such that the first conductor layer does not overlie the dielectric layer, wherein an RF tag, which is electrically isolated from the first conductor layer, is located in the vicinity of the area of absence of the first conductor layer.

A yet further aspect of the invention provides a single island decoupler for an RF tag for decoupling said device from a surface comprising at least one dielectric layer sandwiched between at least one first conductor layer and at least one second conductor layer, wherein the first and second conductor layers are independently tuned to a resonant frequency of interrogating radiation, wherein said length G of the said conductor layer is determined by $\lambda \approx 2$ nG, wherein an RF tag, which is electrically isolated from said first and second conductor layer, is located in the vicinity of an area of absence on said dielectric layer.

A yet further aspect of the invention provides a single island decoupler for an RF tag for decoupling said device from a surface comprising at least one dielectric layer sandwiched between at least one first conductor layer and at least one second conductor layer, wherein the first conductor layer is tuned to the resonant frequency of a first interrogating radiation, and the second conductor layer is tuned to the resonant frequency of a second interrogating radiation, wherein said length G of the first conductor layer and second conductor layer is determined by $\lambda \approx 2$ nG, wherein the first and second conductor layers have one area of absence at, at least one edge, such that the area of absence of the first conductor layer does not overlie the dielectric layer or area of absence on the second conductor layer, wherein an RF tag, which is electrically isolated, is located in the vicinity of the area of absence of the first conductor layer and optionally a further RF tag, is located in the vicinity of the area of absence of the second conductor layer.

There is further provided a method of making a cardboard decoupler with a corrugated cardboard dielectric core, comprising the steps of placing a first conductor layer on a first cardboard layer, placing a second conductor layer on a second cardboard layer, bringing said first and second cardboard layers together and adjoining them with a corrugated cardboard insert such that there is at least one area of absence on the first conductor layer on the first cardboard layer which overlies the second conductor layer.

In one embodiment said first conductor layer is located on the inner surface of said first cardboard layers adjacent said corrugated cardboard insert and/or said second conductor layer is located on the inner surface of said second cardboard layers adjacent said corrugated cardboard insert.

There is further provided a method of tracking a body or a container comprising the steps of applying to a proportion of the surface of said body or container a decoupler as hereinbefore defined and at least one RF tag interrogating the at least one RF tag with RF radiation, detecting the response from the at least one RF tag.

BRIEF DESCRIPTION OF THE DRAWINGS

Embodiments of the invention are described below by way of example only and in reference to the accompanying drawings in which:

FIG. 21a-g show a top view of a variety of geometric designs for the first conductor layer.

FIGS. 22a and b show an example of a low Q tag, both in isolation and mounted on a single island decoupler.

FIG. 22c presents example schematics for low-Q antennas.

DETAILED DESCRIPTION OF THE PREFERRED EMBODIMENTS

Figure 1:
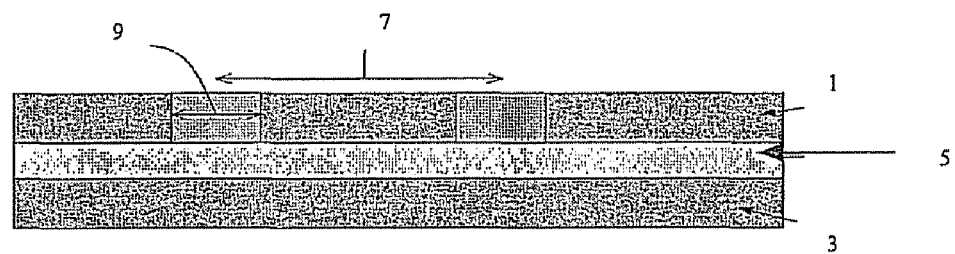
FIG. 1 shows a basic representation of an electromagnetic radiation decoupler according to the present invention.

Turning to FIG. 1, a multi-layer electromagnetic radiation decoupling material comprises a first conductor layer 1 and a second conductor layer 3. Conductors 1 and 3 sandwich a dielectric core 5.

In an example of a decoupler constructed for use with an 866 MHz UHF RF tag the thickness of each of the copper conductor layers 1 and 3 was 2.5 microns and the thickness of the dielectric was approximately 360 microns. Slit width (9) was 0.490 mm. length of tuned first conductor layer (7) was 95 mm. Such a construction led to resonance at a half wavelength of approximately 95 mm. 866 MHz is 346 mm in vacuo and c. 190 mm in PETG (hence 95 mm is half-wavelength) due to a core refractive index of approximately n=1.8. It should be noted that the total thickness of the three layers (approx. 400 microns) is around $1/1000^{th}$ the wavelength of the incident radiation.

Figure 2:
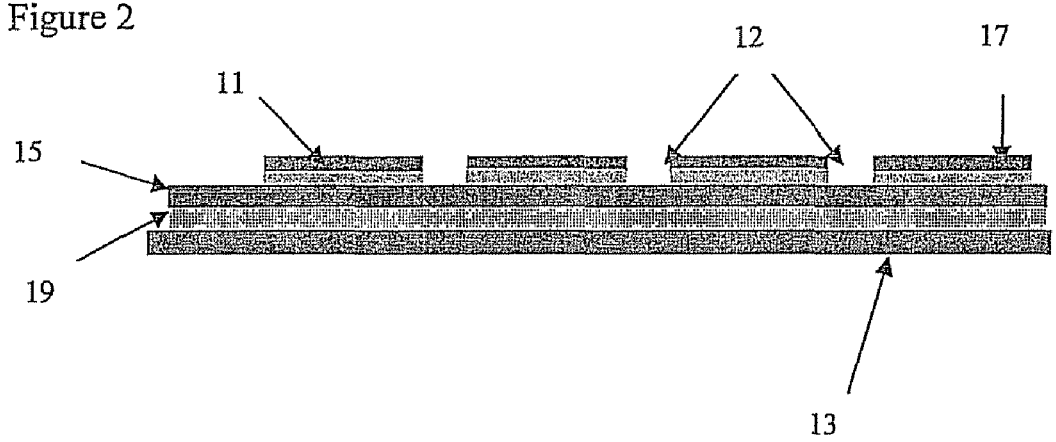
FIG. 2 shows a further decoupler according to the present invention.

FIG. 2 shows a further example of a radiation decoupler according to the present invention. In this case copper layers 11 and 13 sandwich a polyester layer 15. The upper copper layer 11 contains a slit arrangement 12.

The structure of FIG. 2 was constructed by autocatalytically depositing the copper layer 11 onto the polyester layer 15. A sensitising material 17 was used to promote the deposition reaction. A layer of adhesive 19 bonds the polyester layer 15 to the bottom copper layer 13.

In the example constructed and tested, the copper layer 11 was of thickness 1.5-2.0 microns, the sensitiser layer 17 was of thickness approx. 3-4 microns, the polyester layer 15 was of thickness approx. 130 microns, the adhesive layer 19 was of thickness approx. 60 microns and the bottom copper layer was of thickness 18 microns.

Figure 3:
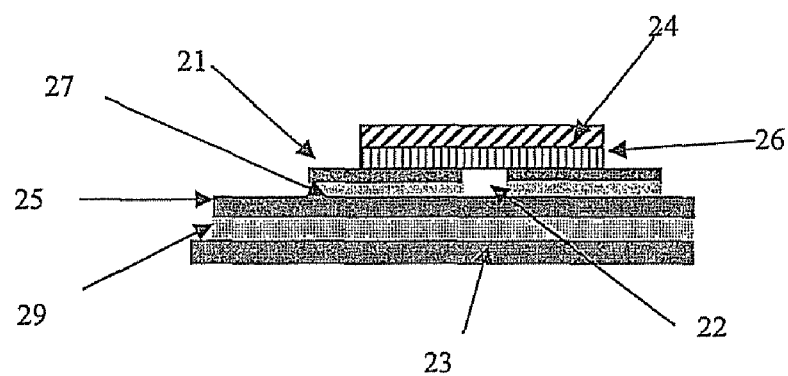
FIGS. 3a and 3b shows a side view and plan view respectively of a two island decoupler.
Figure 3:
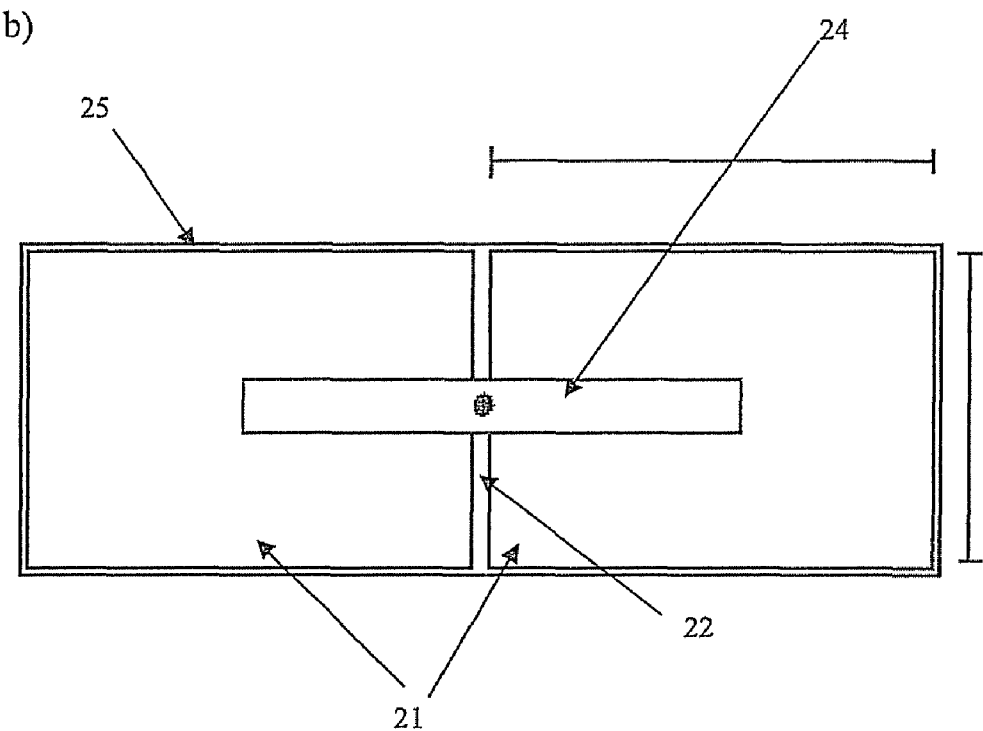

FIG. 3a-b shows a two island decoupler according to the invention, with copper layers 21 and 23 sandwiching a dielectric layer 25 bonded to the lower copper layer 23 by an adhesive layer 29. The upper copper layers 21 (i.e. the 'islands') have been deposited by electroless methods followed by electrolytic deposition on a sensitising material 27, and the layers are configured to contain a slit arrangement 22. An RF tag 24 is mounted on a spacer 26 to provide a stand off from the surface of the decoupler. The tag plus spacer is mounted on top of the first conductor layer 21, such that the chip at the centre of the tag (black circle on plan view b of tag 24 is located directly above the centre point between the two islands.

Figure 4:
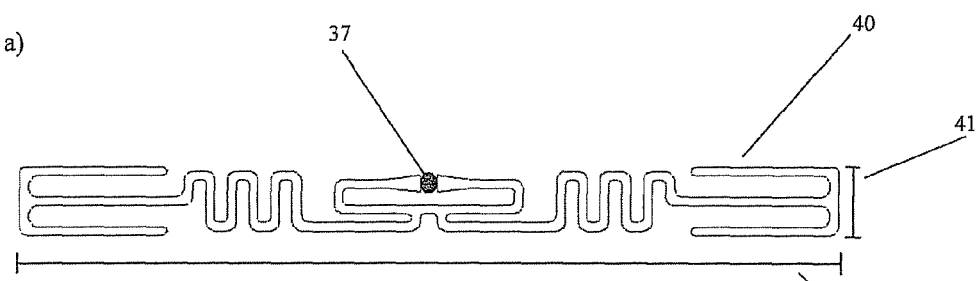
FIG. 4a-c shows a) a UHF tag, which is subsequently located on a four island decoupler, in b) plan and c) side views.
Figure 4:
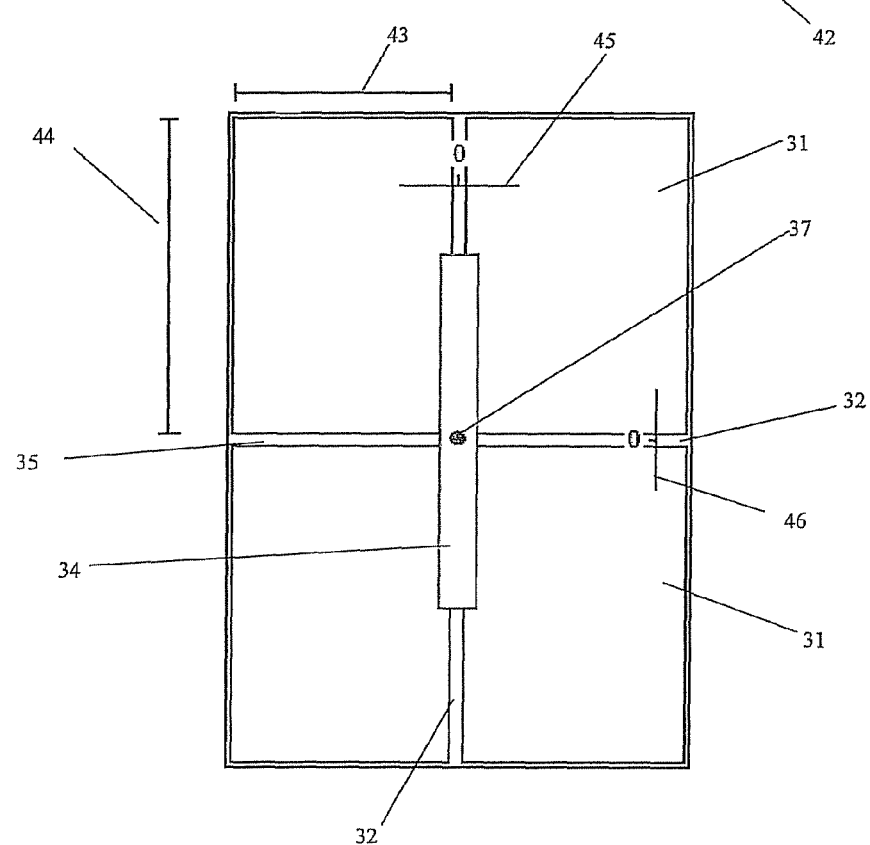
Figure 4:
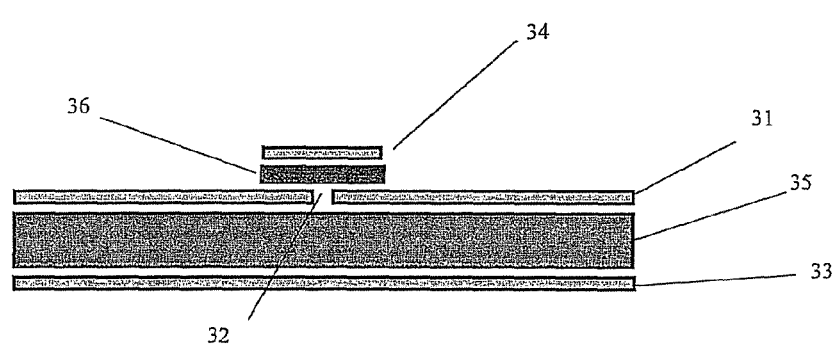

FIG. 4a shows a plan view of a commercially available standard UHF tag (in this example an 866 MHz Alien technologies UHF Tag), comprising a chip 37, with antenna 40. The width of the tag (41) is 8 mm and the length of the tag (42) is 95 mm. This is an example of a tag having an antenna tuned for the incident radiation in free space operation (assuming free space operation) and it can be seen that the majority of the size of the whole RF tag is due to the antenna. The chip itself is much smaller in the order of a millimetre.

FIGS. 4b and 4c show a four island decoupler. The four islands 31 are arranged on the surface of a dielectric core material 35. The islands 31 are separated by area of absence 32. The area of absence are substantially orthogonal to each other. They are located such that the point of intersection of the two slits 32 crosses through the centre of the decoupler. Fiducial mark 46 indicates the absolute centre of the length dimension and fiducial mark 45 indicates the absolute centre of the width dimension. The tag 34 is placed directly over the point of intersection, such that chip 37 sits directly on the point of intersection of the lines drawn from point 46 and 45.

The island 31 has a length 44 which is calculated using the approximate formula of island length≈λ/(2 n), in which n is the refractive index of the core, providing an island length 44 of approximately 95 mm (PETG as core material). The width of the island 43 depends on the physical size of the RF tag and the wavelength of the interrogating radiation that is being used. In this particular example the width of the island 43 was taken as 4 times the width of the tag, approximately 35 mm.

FIG. 5a-c shows a plan view of various configurations for the location of the RF tag. FIG. 5a presents a sixteen-island decoupler to illustrate the orientations of interest on one schematic: FIGS. 5b and 5c illustrate the four-island decoupler that was previously discussed. The effect of the configurations is discussed in specific examples 6, 7 and 8.

Although the above examples relate to the absorption of millimetric to centimetric wavelengths the skilled person will appreciate that the above principles can be applied with different slit structures and layer thicknesses and island lengths and core refractive indices in order to produce an electromagnetic decoupling material that can interact with radiation in other parts of the e/m spectrum, e.g. infra-red, visible, radiowaves etc.

Figure 6:
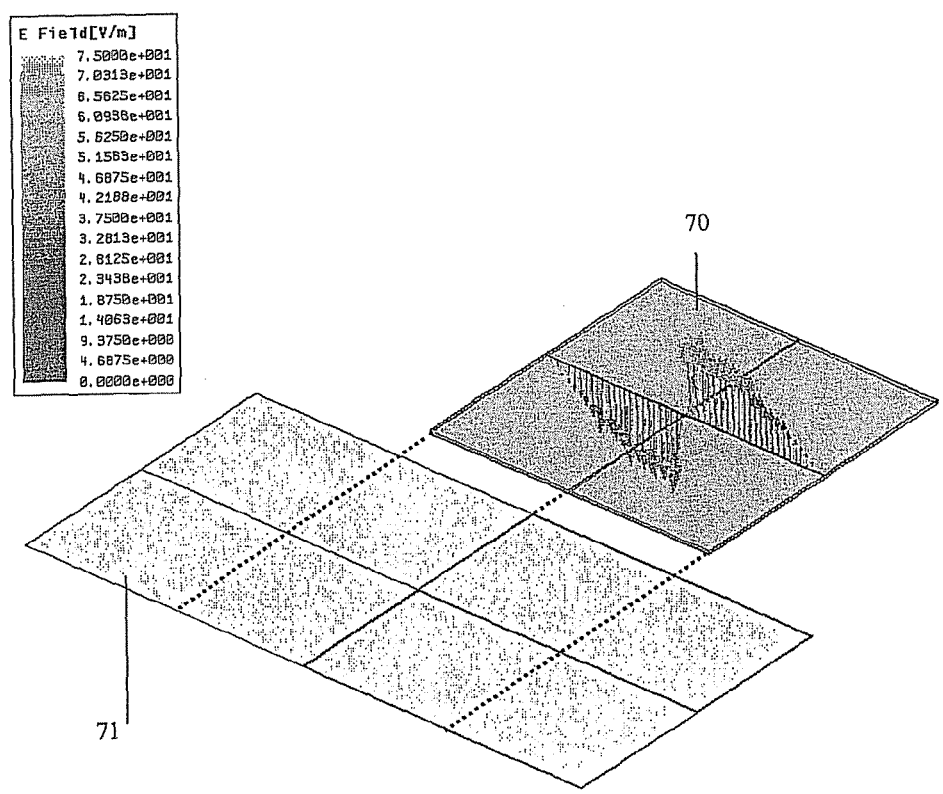
FIG. 6 is a plot of the electric field vector along the slit parallel to the incident electric field (i.e. long-axis of decoupler).

FIG. 6 shows a plot generated by High Frequency Structure Simulator (HFSS) provided by Ansoft®, which was used to model a four island decoupler also referred to as a bi-grating (as it can be seen as having two orthogonal slits which intersect.) designed to operate at 866 MHz. Whilst the performance of the full decoupler 71 was modelled, the field patterns are only presented for the centre portion 70.

The dielectric core is 1 mm thick PET, the overall period of the structure is 95.12 mm, with a width of 190 mm with 0.49 mm wide slits. The aim was to identify the regions of enhanced electric field and determine how field strength varied with distance above the surface and along slits either parallel or perpendicular to the incident electric field vector. In all cases the incident electric field had an amplitude of 1 V/m and was polarised parallel to the y-axis, as defined in FIG. 5b. The direction of the incident electric field vector is shown by the arrows.

The half-wavelength resonance can be seen clearly: the nodes are present at the boundaries of the model (midway between the slits), and there is an anti-node at the slit intersection. It can be seen from the plot that the region of enhanced electric field (i.e. longest arrows) is centred at the predicted antinode. Conveniently it is advantageous to locate RF tags at the regions of enhanced electric field, and hence the chip is preferably located at the point of intersection.

Figure 7:
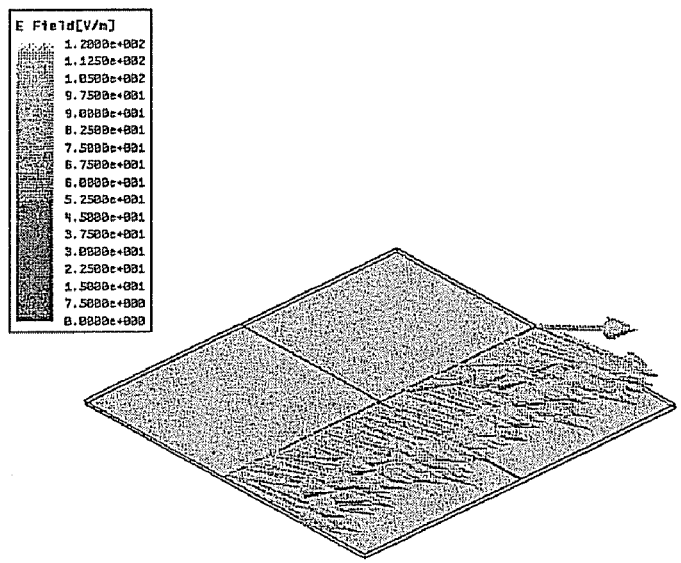
FIG. 7 is a plot of the electric field vector along the slit perpendicular to the incident electric field.

FIG. 7 shows a plot of the electric field vector along the slit perpendicular to the incident electric field. Note the change of scale: the field has been enhanced to over 120 V/m compared to 75 V/m for the original slit (i.e. the fields are more intense along the x-axis slit than the y-axis slit). Again, the plot is not of the full decoupler and only for the centre portion, as for FIG. 6.

Figure 8:
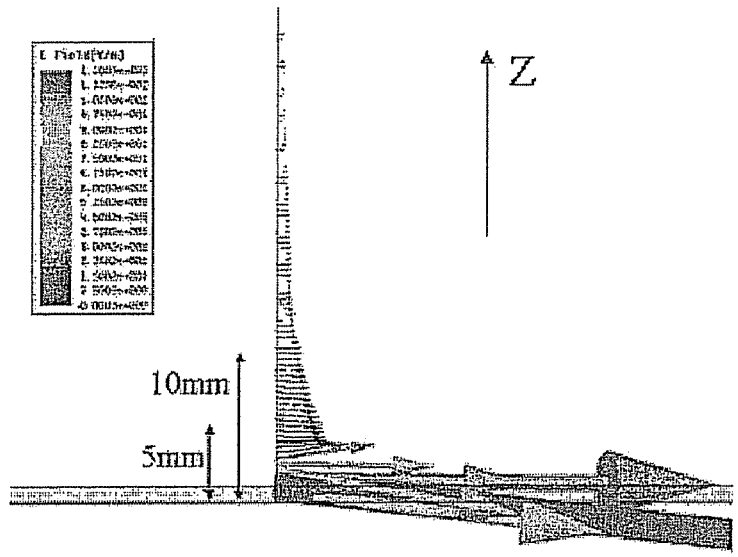
FIG. 8 is a plot of the electric field vector along a line perpendicular to the surface of the decoupler.

FIG. 8 shows a further plot of the electric field vector (snapshot in phase) along a line perpendicular to the surface of the decoupler, again with a Max 120 V/m scale. The strength of the electric field decays as the perpendicular distance from the surface of the decoupler increases.

Figure 9:
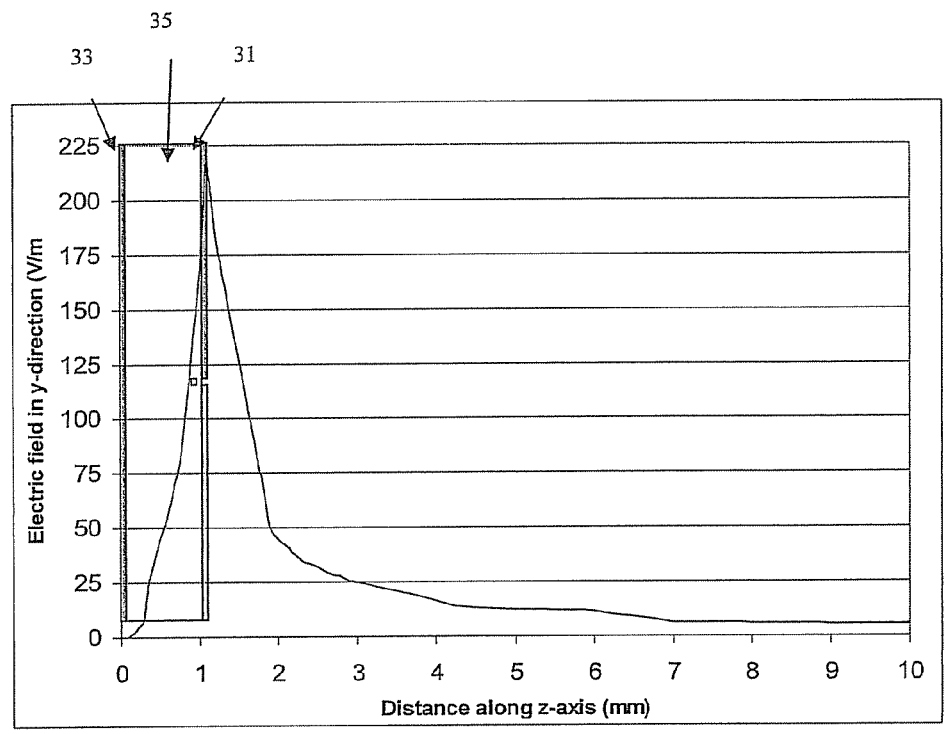
FIG. 9 shows the magnitude of the electric field in the y-direction along line 1: parallel to the z-axis through the decoupler dielectric core and the air space above.

FIG. 9 shows how the magnitude of the electric field in the y-direction (this may be seen in FIG. 10a along line 1) varies along a line parallel to the z-axis, i.e. through the thickness of the decoupler dielectric core and into the air space above. FIG. 9 presents data from FIGS. 7 & 8 which have been resolved into x- y- and z-components. The y-components are plotted with the position of the decoupler superimposed on the graph to demonstrate where the high field regions occur. The top surface 31 with slit, is formed on a dielectric core 35 and comprises a second metallic surface 33. The graph shows the expected trend: the field is low adjacent to the lower metal surface within the core and increases to a maximum of 220 V/m within the slit. The small slit shown in yellow on this diagram and is only modelled to show where the field is highest in the z-dimension—i.e. not X or Y dimensions. The increased value of 200 V/m over previous models is due to the data coming from a more highly refined model: greater density of finite element mesh and greater number of data points also so as to pick out the very peak of the electric field. In the air above the decoupler itself the field strength is high but falls rapidly as distance from the decoupler surface increases. Above 10 mm the enhanced field is no longer apparent and the field behaviour returns to sinusoidal.

Figure 10A:
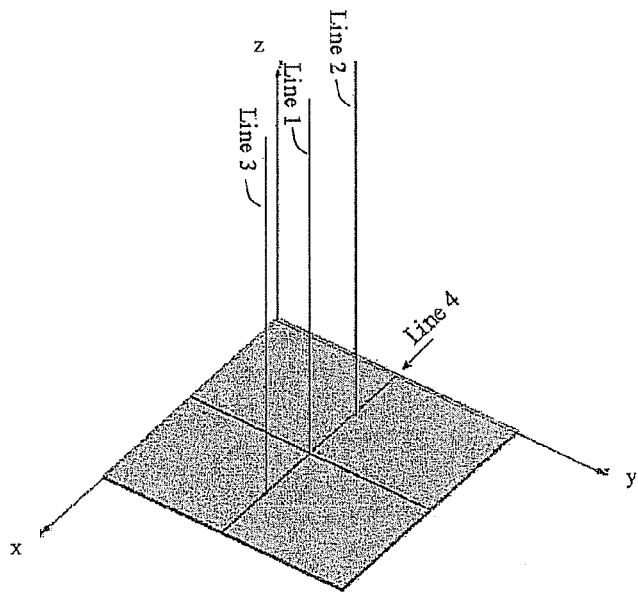
FIGS. 10a and b show a plot of the magnitude of the electric field in the y-direction along 3 different lines all parallel to the z-axis.

FIGS. 10a and b shows a plot of the magnitude of the electric field in the y-direction along three different lines (1-3), all parallel to the to z-axis. The lines all pass through the slit that runs perpendicular to the incident electric field vector (i.e. along line 4, parallel to the x-axis).

Figure 10B:
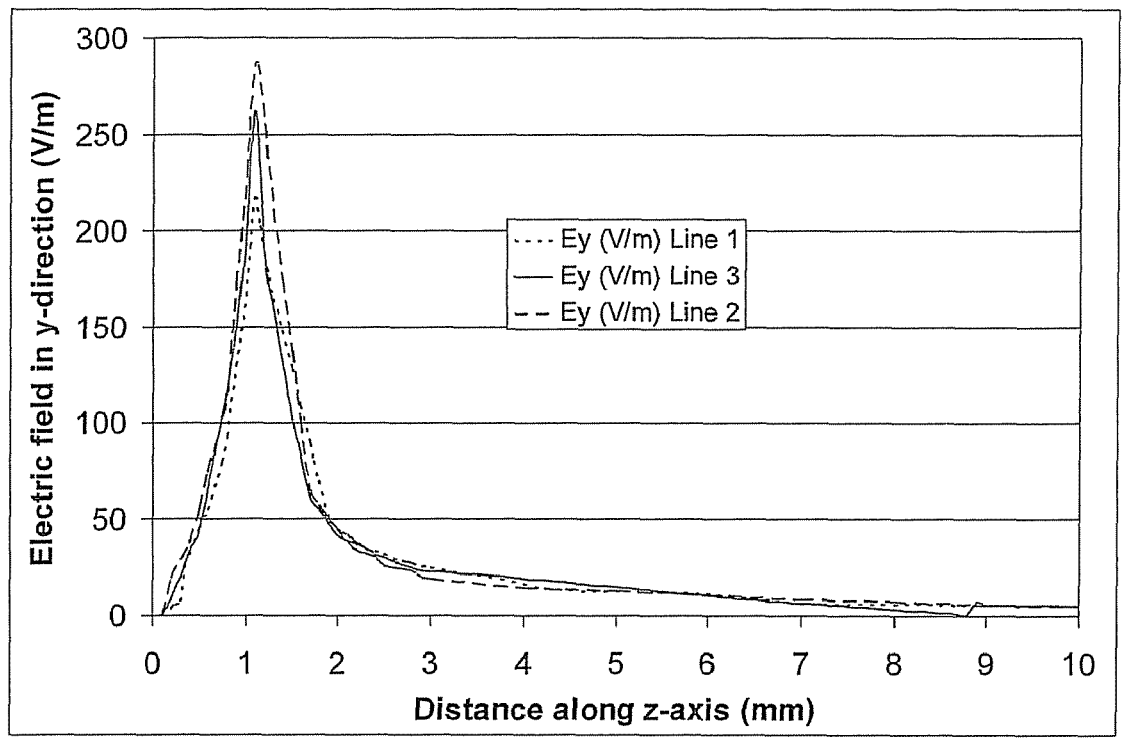

FIG. 10b shows that the trend is the same for all three curves: there is a high electric field in the slit region, which decreases quickly with increasing distance along the z-axis, i.e. as the field moves away from the surface of the decoupler. The maximum field strength is approximately 40 V/m greater for lines 2 and 3 than for line 1. This may be due to curvature of the field lines at the point where the slits cross i.e. the line through which line 1 passes. This can be seen more clearly in FIG. 11 where the field strength along line 4 has been plotted, which is in agreement with the plot in FIG. 8. Other factors such as the amount of the tag lying over a slit will also have an effect on the performance.

Figure 11:
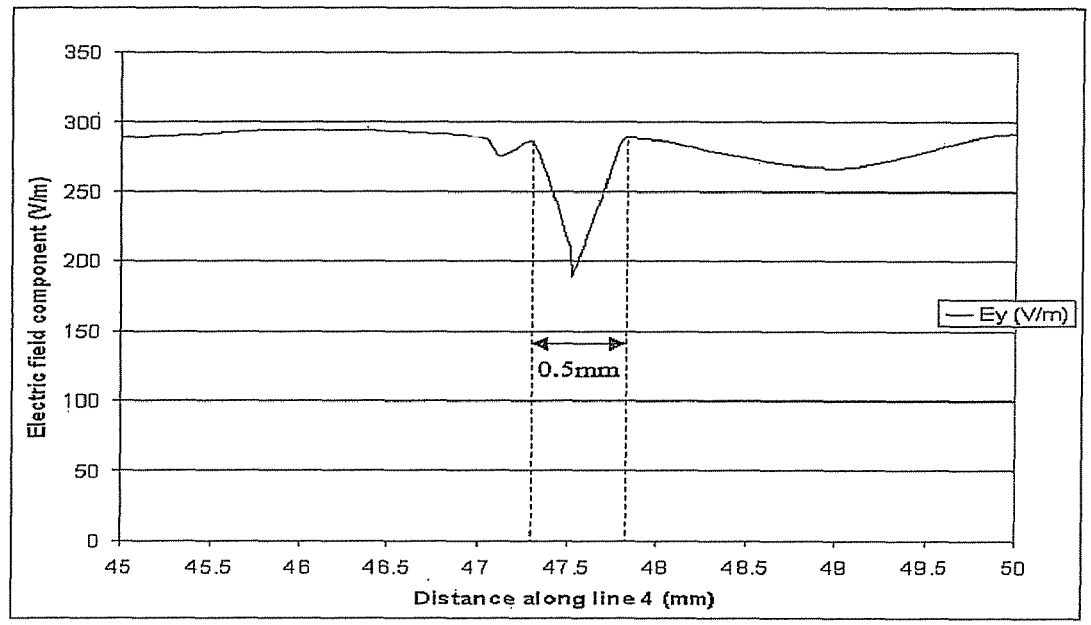
FIG. 11 shows a plot of the magnitude of the electric field in the y-direction along line 4 (as generated in FIGS. 10a and b)

FIG. 11 shows a plot of the magnitude of the electric field in the y-direction as measured along line 4, and as shown in FIGS. 10a and b. Line 4 runs through the slit that is parallel to the x-axis. The slit is 0.49 mm wide and has its centre at 47.6 mm. The main feature on the graph is approximately 0.5 mm wide and is centred on the slit thus confirming that the electric field in the y-direction is slightly weaker where the slits cross. However, it is advantageous to place the tag on this crossing point since its antenna then lies along the y-axis slit.

Symmetry dictates that the field strengths along lines 2 and 3 should be identical. The variance between them gives an indication of the accuracy of the solution. As an approximate measure: the peak field strength along line 2 is in the region of 10% greater than that along line 3, hence it can be said that all field values are subject to an error of +/−10%. This is due to the electric field gradient (dE/dz) being a fast changing function needing a highly dense finite element mesh and high density of data points to accurately map its behaviour.

Figure 12:
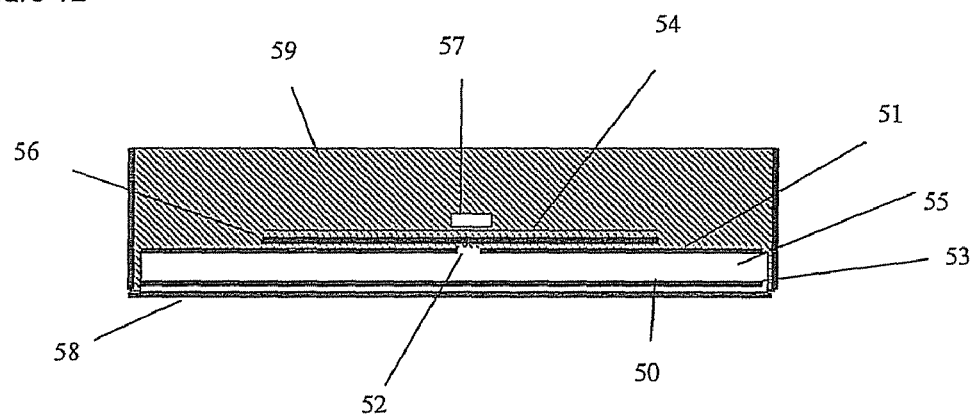
FIG. 12 shows a cross section of a recessed identification plate.

FIG. 12 shows a cross section of a recessed identification plate. The identification plate 58 is not shown to scale and the wall thickness may not be in true perspective with regards to the other components. A decoupler 50, has four islands in the surface layer 51 which are arranged on the surface of a dielectric core material 55. The islands 51 are separated by area of absence 52. The areas of absence or slits are substantially orthogonal to each other. The slits are located such that the point of intersection of the two slits 52 crosses through the centre of the decoupler. The tag 54 is placed directly over the point of intersection, such that chip 57 sits directly on the point of intersection. The tag 54 is separated from the decoupler 50 by way of a spacer material 56.

The lower metallic surface 53 of the decoupler may be a discrete layer or it may form part of the plate 58 if the base of this plate is made from a conducting material. The void areas in the plate are then filled with a protective layer material 59 to substantially envelope the tagging system and prevent damage to the chip 57 and the decoupler 50. The figure may also represent the recess portion in a metallic body or container, such that plate 58 comprises the recess in a metallic body or container, such as, for example, a drink or food container. The diagram is not to scale and may be manufactured such that the depth of the recess is less than 1 mm or more preferably less than 0.5 mm or even less than 250 microns.

Figure 13:
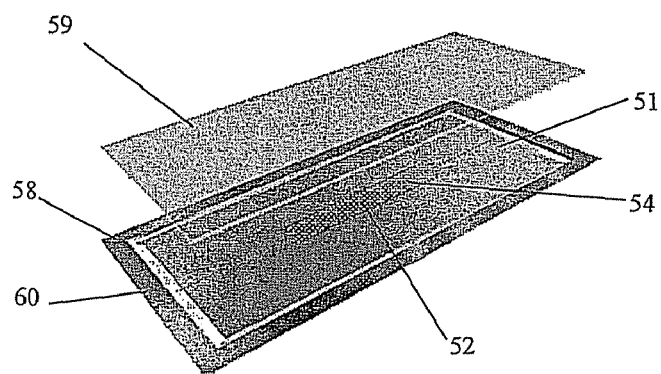
FIG. 13 schematically represents the construction of a recessed identification plate.

FIG. 13 shows an exploded projection of a recessed identification plate 58. The top of the plate may optionally have a lipped edge 60. The decoupler 50 with area of absence 52 has an RF tag 54 (shown in outline only) placed over the intersection of two slits. The decoupler or tagging system may be reversibly attached to the plate 58, and a protective layer 59 may be applied as a sheet material to cover the decoupler. The decoupler 50 (or tagging system) and protective layer 59 may be removed from the identification plate. The protective layer may be suitable compound such as for example Polyurethane, Epoxy PVC or ABS. The plate 58 may be manufactured out of any sheet metal or cast metal. The plate 58 may be made from any suitable material such as 1 mm thick mild steel, formed using a punch, whilst more lightweight materials such as alloys or Aluminium are also cheap and easy to manufacture. Similarly, the walls of the identification plate may represent the walls of a recess within a metallic body or container.

Figure 14:
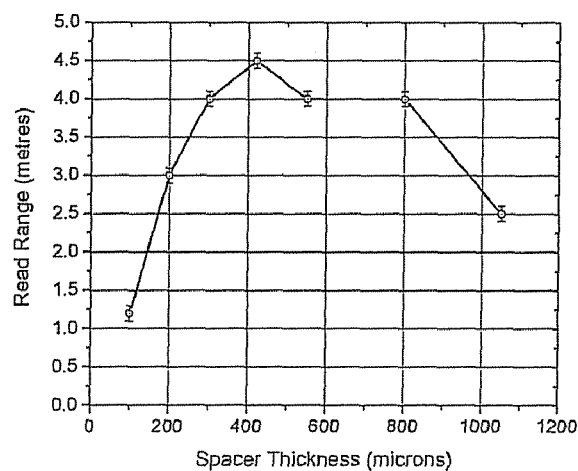
FIG. 14: shows the relationship of read-range upon spacer thickness for a given geometry and combination of materials with a Sensormatic® reader.

FIG. 14: shows the dependence of read-range upon spacer thickness for PET sheet spacer materials utilised in a specific decoupler geometry, see Example 8. the results are with a Seonsormatic reader and the read range is generally lower than for the Alien Technology system. It will be clear to the skilled man that different readers systems use transmitters with different power levels. Hence absolute read range is only significant when comparing results for the same system. A more powerful transmitter will allow a longer read range to be achieved. The results in all experiments must therefore only be taken as trends and not absolute read range with every available system. However, a more powerful transmitter will not mitigate the effects of a nearby RF reflective surface such as a metal.

Figure 15:
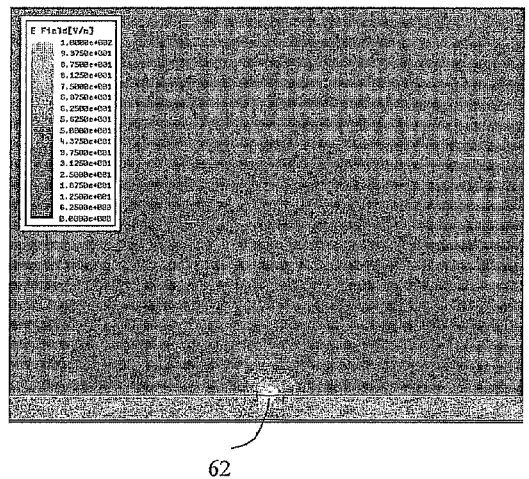
FIG. 15: Plot of the magnitude of the electric field in the dielectric core of the decoupler at the fundamental resonant frequency.

FIG. 15: shows a plot of the magnitude of the electric field in both the dielectric core of the decoupler, seen at the bottom of the plot, and the vicinity of the slit 62, at the fundamental resonant frequency. The paler the shading, the more intense the electric field, with the white region above the slit indicating approximately a 150- to 200-fold field enhancement.

Figure 16:
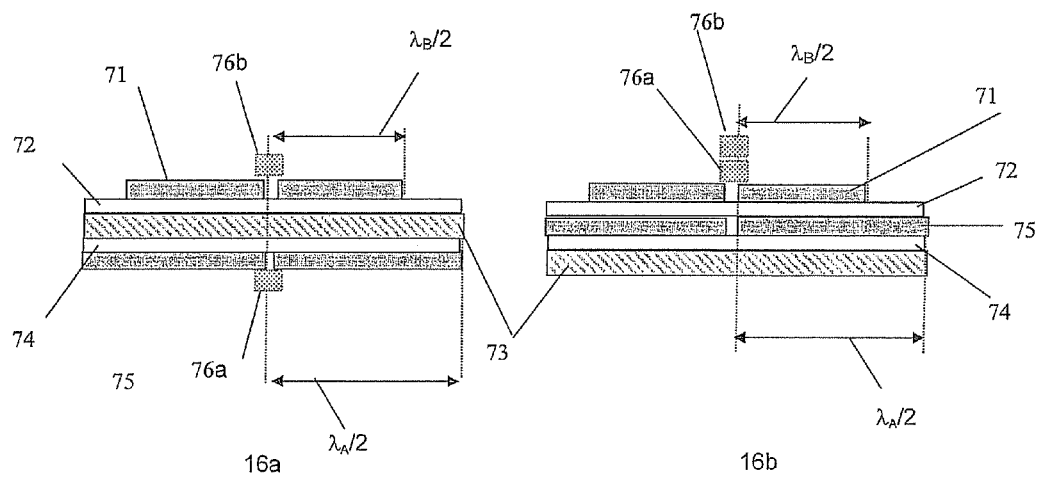
FIG. 16 shows a cross section of broad band decoupler with two or more islands.

FIG. 16 shows a cross section of a broad band decoupler, i.e. a decoupler which may decouple radiation at more than one frequency band FIGS. 16*a* and 16*b* show two example configurations, both of which are based on the two island decoupler principle. In the example shown in FIG. 16*a* the decoupler has a first conductor layer 71, a dielectric layer 72 and a second conductor layer 73 forming a decoupler structure as described above, i.e. dielectric 72 is sandwiched in between the conductor layers 71 and 73. The first conductor layer, which is formed as two islands separated by an area of absence has been designed to decouple radiation at a frequency □B (and may have a period of □B/2). An RF tag 76*b* may be placed over the area of absence. Additionally on the opposite surface of the second conductor layer 73 a dielectric layer 74 is sandwiched in between an additional conductor layer 75 and second conductor 73. This additional conductor layer is also a two island structure has been designed to decouple radiation at a frequency □A (and may have a period of □A/2). A second RF tag 76*a* which may have a different operational frequency to tag 76*b* may be placed over the area of absence in conductor layer 75 (in similar manner to tag 76*b* being located on layer 71). This is useful where RF tags with different resonant frequencies are required.

In order to more clearly show the specific arrangements of the decouplers, in certain diagrams, the RF tag has been simplified and is merely represented as a box, this may represent a low Q or normal RF tag, which may optionally be mounted on a spacer.

FIG. 16*b* shows a different arrangement of the broad band decoupler. In this arrangement the different half wavelength conductor layers 75 and 71, are separated respectively by dielectric layers 74 and 72, and are both mounted on the same first (upper) surface of the second conductor layer 73. The length of layer 75 is such that in combination with the other dimensions and materials of the decoupler a resonance is produced which corresponds to frequency □A and layer 71 has a length which by the same mechanism corresponds to a frequency □B. There may be one or more RF tags 76*a* and 76*b* mounted on the surface of layer 71 which are activated at frequencies □A and □B. It would be possible to have this arrangement of two or more decouplers on both sides of second conductor layer 73 to give 4 or more different frequencies.

Figure 17:
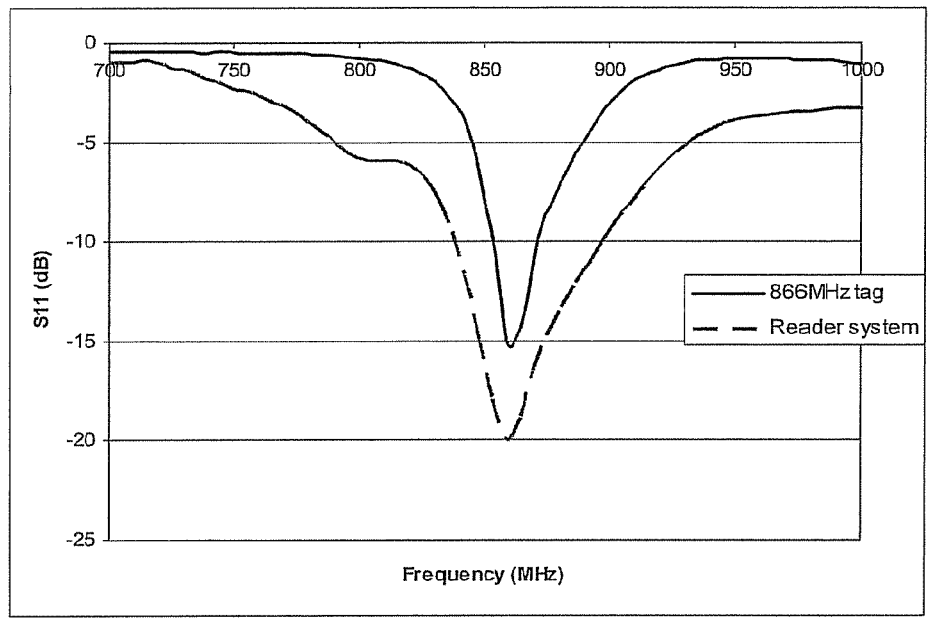
FIG. 17 shows a graph of the performance of an 866 MHz tag and a Sensormatic reader, without a decoupler.

FIG. 17 shows a graph of the performance as measured using a Vector Network Analyser of both an 866 MHz tag in free space (i.e. not mounted on a decoupler) and a Sensormatic reader antenna, The deeper the reader curve the more power the reader antenna is emitting. The deeper the tag curve the more power the tag is taking up from the wave emitted by the reader antenna. The more power gets into the tag the greater is the read-range, and hence it is best to have the two curves centred on the same frequency: the tag is picking up power optimally at the frequency at which the reader is emitting the most power. Whilst aligning the two curves produces the best performance, the tag will operate, with a lesser read-range, if its curve overlaps any part of the reader curve.

Figure 18:
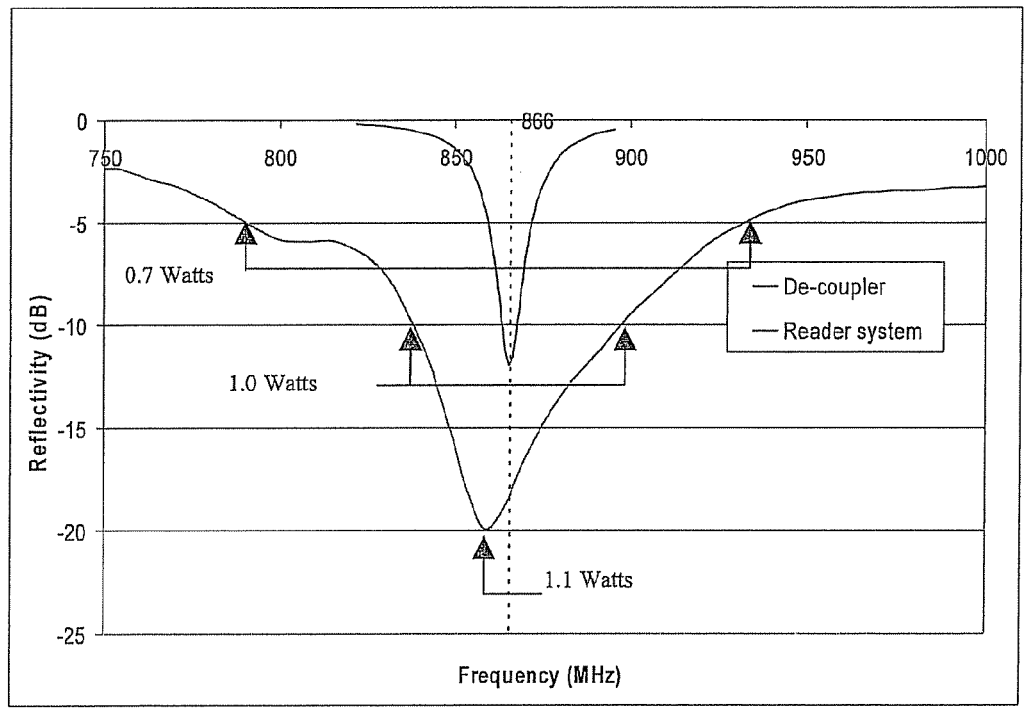
FIG. 18 shows a modelled graph of the decoupler curve and the same reader curve as in FIG. 17.

FIG. 18 shows a modelled graph of the performance of a decoupler according to the present invention compared to the same reader as shown in FIG. 17. The decoupler intercepts power emitted from the reader antenna. This power is channelled through an area of absence at a point of high electromagnetic energy into the dielectric core between the first conductor layer and the second conductor layer. It is these intense electric fields that are used to power the tag.

The decoupler, much like the reader and the tag, intercepts power over a range of frequencies and performs optimally at one particular frequency. As in FIG. 17, the maximum read-range for the tag on the decoupler will be achieved by getting the maximum amount of power into the decoupler and hence into the tag. This may be achieved by getting the centre of the two performance curves to line up—that of the decoupler, tag and the reader.

It has been observed that a decoupler, originally designed for 866 MHz, can also de-couple tags that operate at 915 MHz in free-space. The Alien 915 MHz tag is very similar to the Alien 866 MHz tag—the only difference is in the main bulk of the antenna which is tuned for 915 MHz. The antennas for both tags incorporate an impedance loop and the relevant impedance loops are largely identical. It has been shown that the decoupler renders the main bulk of the antenna redundant. Hence when the antenna is on the decoupler it is only the impedance loop that matters. This figure is specific to the Sensormatic kit. The objective was to compare resonant frequencies and bandwidths. It is therefore preferable that the decoupler curve falls within the reader curve the system (decoupler plus tag) will work and more preferably the resonant frequencies (minima of the two curves) should coincide.

The decoupler is still intercepting power optimally at 866 MHz and intercepting virtually no power at 915 MHz as its performance curve is close to 0 dB at this frequency, as can be seen in the graph (some extrapolation needed). Therefore the tag, despite being designed to operate at 915 MHz, is being driven into operation at 866 MHz. This is possible because the chip will operate almost as well at 866 MHz as it will at 915 MHz. Therefore the decoupler functions over a frequency range, but the maximum performance will be achieved when the decoupler, the reader and—to a lesser degree of importance—the tag are operated at the same frequency.

Figure 19:
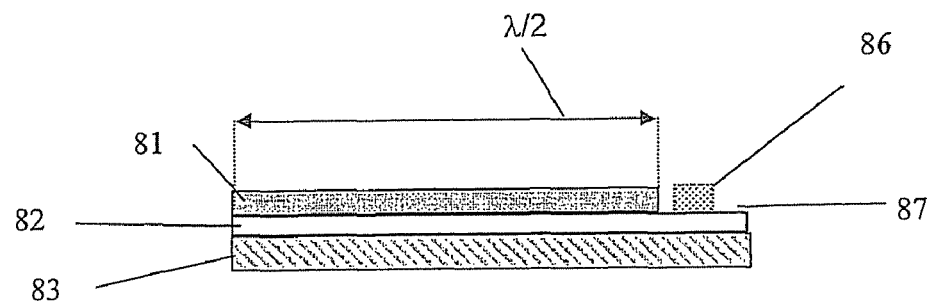
FIG. 19 shows a single island tag with a low Q antenna (small area, non optimised antenna).

FIG. 19 shows a tag with a low Q antenna (small area antenna) 86 mounted on a single island decoupler. The decoupler has a similar structure to the two island decoupler except that there is only one island on the first conductor layer 81 and the area of absence 87 area of absence is located at the end of the first conductor layer 81. The first conductor layer 81 and second conductor layer 83 sandwich the dielectric layer 82. The length of the first conductor layer will determine the frequency of the decoupler (for a specific dielectric layer—material and thickness and also to a lesser extent conductivity of the conductor layers).

FIGS. 20a and b show two example configurations for broadband single island decouplers (based on FIGS. 16a and b). FIG. 20a presents a cross section of a broad band decoupler in which there is provided a second conductor layer 93 and on a first surface there is a first conductor layer 91 and a dielectric layer 92 sandwiched in between the conductor layers 91 and 93. The first conductor layer has been designed such that the decoupler may decouple radiation at a frequency □B (and may have a period of □B/2). An RF tag 96 may be placed over the area of absence. Similarly there is on a second surface of the second conductor layer 93 a dielectric layer 94 sandwiched in between an additional conductor layer 95 and second conductor 93. This additional conductor layer has been designed to decouple radiation at a frequency corresponding to wavelength □A (and may have a period of □A/2). An RF tag 96 may be placed over the area of absence 97. This is useful where RF tags with different resonant frequencies are required.

FIG. 20b shows a different arrangement of the broad band decoupler. In this arrangement the conductor layers 95 and 91, are separated respectively by dielectric layers 94 and 92, and are both mounted on the same first surface of the second conductor layer 93. Layer 95 corresponds to wavelength □A and layer 91 corresponds to a wavelength, □B. There may be one or more RF tags 96 mounted on the surface of layer 91 which are activated at frequencies corresponding to wavelengths □A and □B. It would be possible to have this arrangement of two or more decouplers on both sides of second conductor layer 93 to give 4 or more different frequencies.

FIG. 21a-g present plan views of a variety of geometric designs for the first conductor layer 101, with an area of absence 102, with an RF tag 106 placed over the area of absence. Figures a-d are single island decouplers and the shape or geometry may be selected depending on the item or surface to which the decoupler may be provided. Preferably the first conductor layer may exhibit a resonant metal/dielectric/metal cavity length, λ≈2 nG/N, (again the system is resonant) where λ is the wavelength in the range $\lambda_{min}$ to $\lambda_{max}$ where maximum coupling occurs, n is the refractive index of the dielectric, G is the cavity length of the at least one first conductor layer and N is an integer greater than or equal to 1.

There may be one or more tags placed on the area of absence or slits, ideally at a distance which satisfies the above relationship. For example in figure b, there may be an area of absence at one, two, three or four sides of the first conductor layer. The decoupler may be formed in any polygonal shape with a number of sides (n) containing a range of from 1 to n respective areas of absence. This would tend towards providing a substantially circular arrangement such as in figure d. In an alternative arrangement it may be desirable to use a polarisation dependent decoupler with a plurality of RF tags, such that the orientation of an article with respect to a polarised radiation source may be deduced by the subsequent activation of RF tags as they come into alignment with the interrogating field.

Figures c, d, e, f and g show substantially circular decouplers which are substantially polarisation independent, such that the tag may be interrogated irrespective of the direction/polarisation of the incoming RF field. A particular preferred arrangement for a polarisation independent tag is shown in figure f, where the first conductor layer 101 has a circular area of absence or slit 102 present. The RF tag 106, and in particular low Q tags with nominal sized antenna, may be placed at any location on this slit. It has been shown that in this particular arrangement that the shape of the remainder of the first conductor layer that is the shape of the overall decoupler outside of the circular slit need not be circular, in fact a non circular outer shape appears to be advantageous, further advantage lies in a substantially non uniform outer shape. it was shown that the most advantageous results were obtained when the diameter of the slit approached □/4, as opposed to □/2 for the other decoupler designs. The side view of figure f shows the first conductor layer 101 and second conductor layer 101a sandwiching the dielectric layer 102a, with area of absence 102 present in said first conductor layer. A further more preferred arrangement is FIG. 21g where there is an enlarged area of absence 102 in the first conductor layer 101 with the RF tag 206 located on the edge of the area of absence.

Figure 22D:
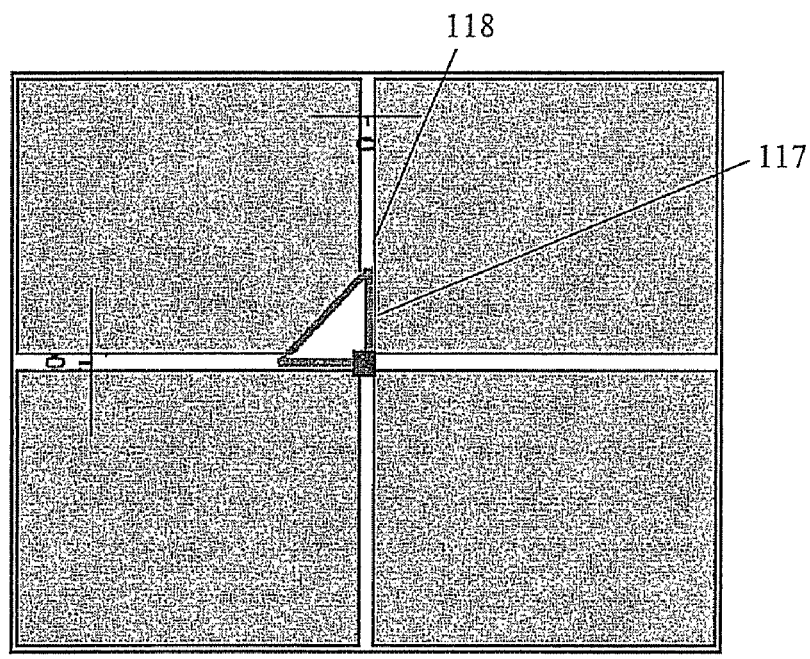
FIG. 22d presents an example of one antenna mounted onto a decoupler.

FIG. 22a shows an example of a low Q 116, which has a small inductance/impedance loop 118 which connects to a chip 117. Referring back to FIG. 4a it can be seen that the tuned tag has a chip and effective inductance loop but also has a significant additional amount of tuned antenna structure. The low Q tag can therefore be thought of as a smaller variant of a tuned tag. The low Q tag 116 does not function in free space at the designed frequency, (but may function at higher frequencies when the perimeter is equal to the wavelength, c.6 GHz), unless the reader is located within 1 or 2 mm of the chip because the antenna 118 is inefficient at coupling to the incident radiation. The low Q tag, which may be only slightly larger than the chip itself, may be placed on any decoupler according to the invention. In FIG. 22b the tag 116 is placed on the area of absence 112 (part of the dielectric layer, see FIG. 19) of a single island decoupler which has a first conductor layer 111 (other layers not shown) which is preferably matched to the frequency of the RF tag reader system. The read range may be comparable to that of an optimised RF tag such as shown in FIG. 4a when used in free space, but any small compromise in read range is compensated for by the very small area of the decoupler and RF tag. The decoupler and tag may have a length which is only just larger than λ≈2 nG/N. This is an ideal size for small articles such as clothing tags, small consumables or for more covert tagging systems. FIG. 22c shows a number of designs for low Q RF tags, that is RF tags where the antenna design (as shown in FIG. 4a) has been substantially removed to leave just the small loop section as shown in FIG. 22a. Alternatively, the small loop section may be replaced by short 'arms' that extend outwards or partially wrap around the spacer, since even two short 'stubs' of metal are sufficient to couple power into the chip if combined with a correctly designed decoupler. In FIG. 22d there is shown a low Q RF tag, where the loop section lies along the axis of two intersecting slits, thereby increasing the polarisation independence of the RF tag.

Figure 23:
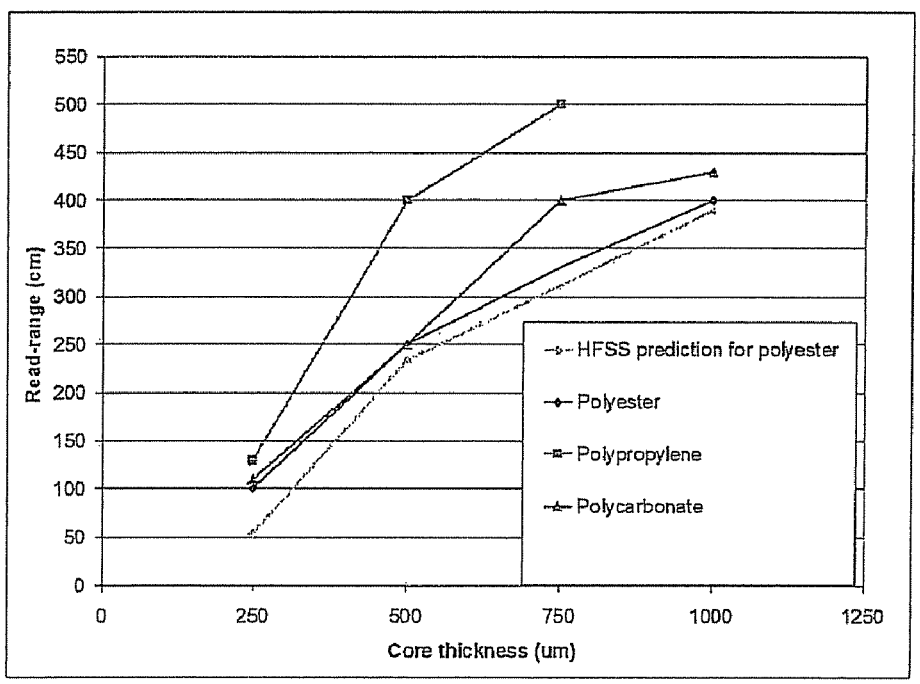
FIG. 23 presents a graph of the influence on read-range of different core materials at a variety of thicknesses, including a theoretical prediction for polyester.

FIG. 23 shows a graph of the effect on read range of three different core materials at a variety of thicknesses as will be further described below with reference to Example 10.

Figure 24:
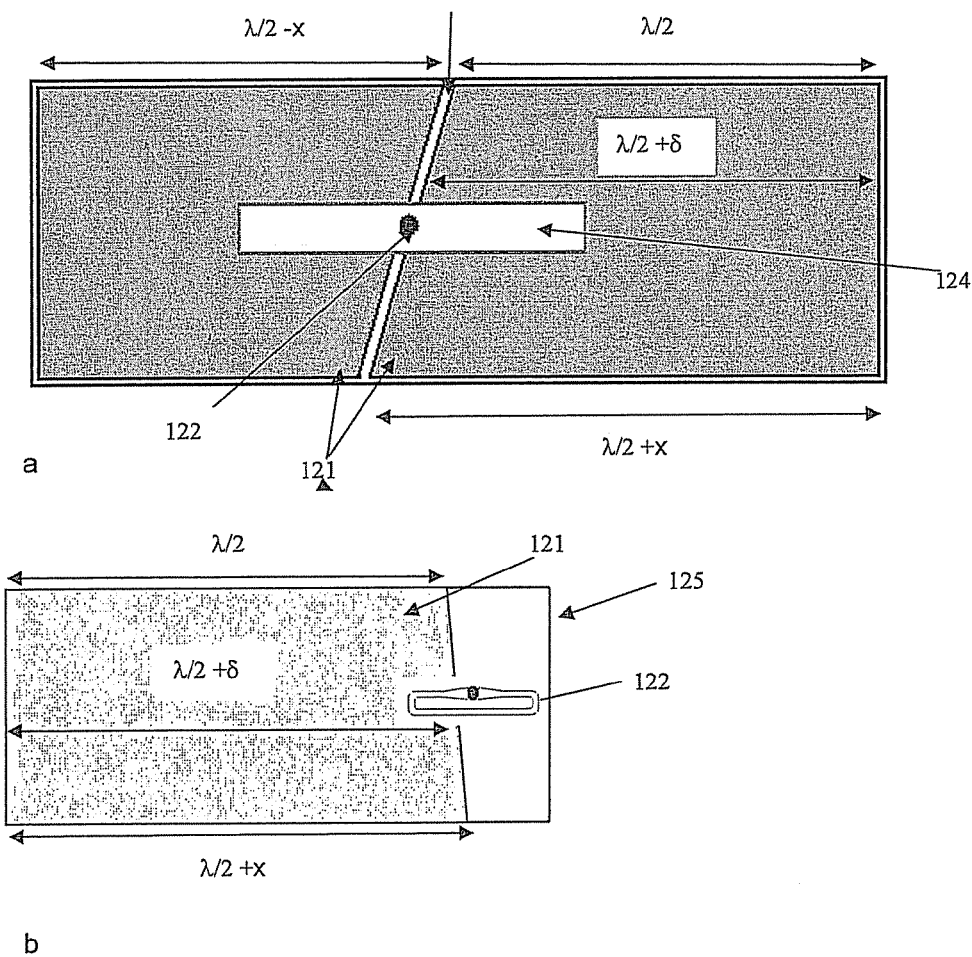
FIGS. 24a and b shows a two island and one island decoupler respectively, the resonant cavities having been designed so that they resonate over a range of wavelengths and hence provide broad-band operation.

FIG. 24a shows a two island decoupler with at least one slit 125, which does not exhibit a single uniform distance from one edge of the decoupler (i.e. it is non-parallel with respect to the edge of the decoupler). This provides a decoupler capable of working over a range of wavelengths. Therefore, the wavelength that the decoupler may function across may be increased or decreased by "x", in increments of "□" depending on the angle of the slit with respect to the edge of the decoupler. This concept may also be used on decouplers with four or more islands.

The same concept may also be provided on a single island decoupler as shown in FIG. 24b, where the edge of the area of absence on the first conductor layer forms a line which is not parallel to the distal edge of the decoupler. This concept may decouple radiation over an increased wavelength range. The wavelength range is only limited by the initial dimensions of the decoupler and the angle of the slit with respect to the edge of the decoupler.

Figure 20:
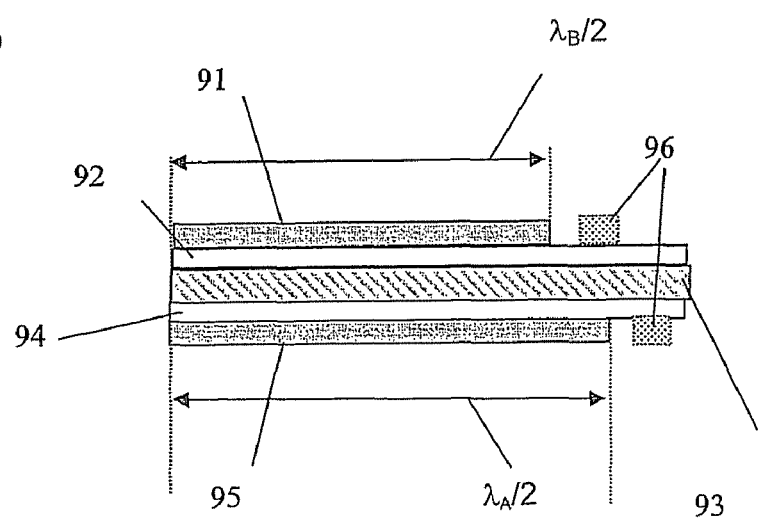
FIGS. 20a and b show example configurations for broad-band single island decouplers.
Figure 20:
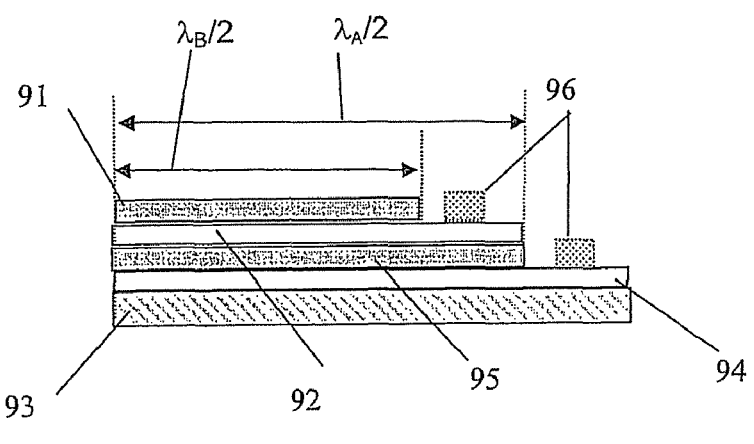

This concept may also be used in conjunction with the broadband decouplers used in FIGS. 16a and b and FIG. 20.

Figure 25:
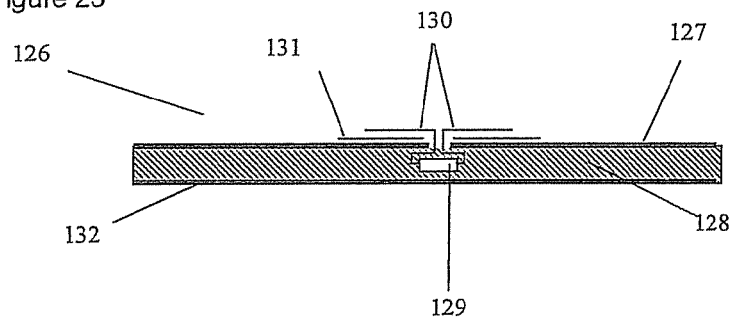
FIG. 25 shows a cross section of an RF tag located within the dielectric layer.

FIG. 25 shows a cross section of a decoupler 126 which has two or more islands in the first conductor layer 127 arranged on the surface of a dielectric core material 128. The islands 127 are separated by area of absence. The tag 129 is located beneath the area of absence. The antenna 130 (if present) of the tag is separated from the first conductor layer 127 by way of a spacer material 131. The lower metallic surface 132 of the decoupler may be a discrete conductor layer or it may form part of a conducting surface to which the decoupler may be applied. The tag 129 and its antenna 130 (if present) need to be electrically isolated from the first 127 or second 132 conductor layers. The RF tag is thus protected by the decoupler structure and the material of the dielectric layer.

Figure 26A:
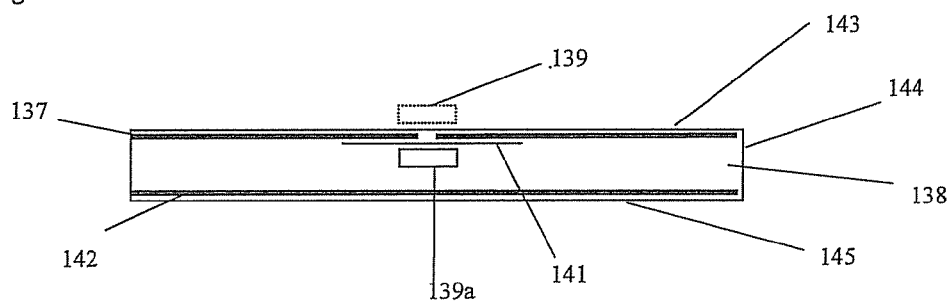
FIGS. 26a, b and c shows three configurations for a decoupler where the first and second conductor layer are separated by an air gap.

FIG. 26a shows a decoupler which possesses a void 138 as the dielectric layer. The decoupler may be prepared on a supported layer or may use part of a container or box for a support. A container possessing an upper side 143, may have a first conductor layer 137 deposited on the internal surface of 143 in any pattern as hereinbefore defined, either of the single island or multiple island designs. At the area of absence an RF tag, 139a which may be either a low Q or a normal tag, may be located over the area of absence, with an optional spacer 141. Alternatively an RF tag 139 may be located on the upper surface of 143, such that the upper surface 143 of the container or box acts as an optional spacer.

The sides of the container 144 provide a means of support to create a void 138 between the upper surface of the container 143 and the lower surface of the container 145. A second conductor layer 142 may be deposited according to any method herein defined on either the first or second surface of the lower surface of the container 145. It may be particularly convenient to place the first 137 and second 142 conductor layers and the RF tag 139 within the void 138, to provide protection. The void may be filled with a dielectric fluid such as, for example, an air gap, a partial vacuum, or filled with an inert gas or inert liquid. For example, the void may also be filled with a non conducting high void content foam or non conducting dielectric filler material. A 1 to 2 mm air gap approximately $1/170^{th}$ of the wavelength of the incident RF wavelength has provided useful read ranges when used with RF tags.

Figure 26B:
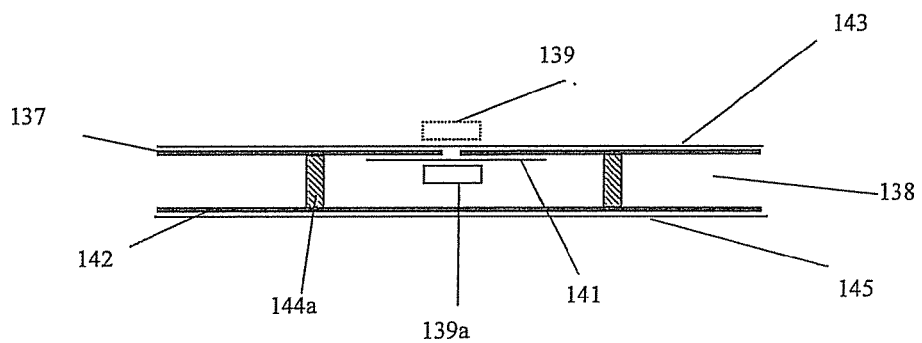

In FIG. 26b, the same features are present as in FIG. 26a except that the sides of the container may not be present and may be replaced by non conducting vias or non conducting support means 144a to provide the correct thickness of dielectric layer 138.

Figure 26C:
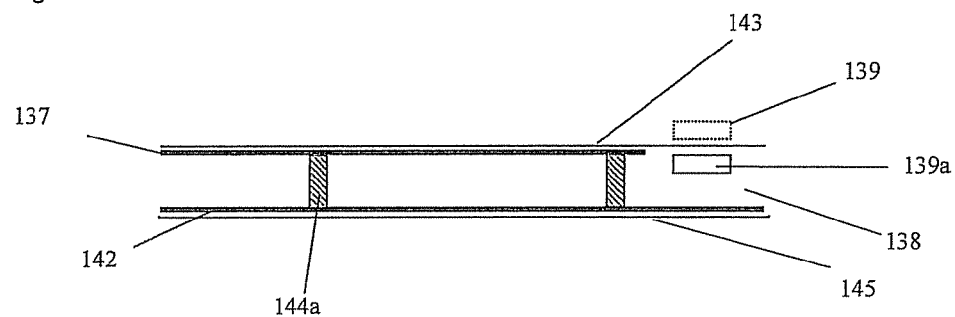

In FIG. 26c, the same features are present as in FIGS. 26a or 26b, except that the first conductor layer 137 forms a single island decoupler. The RF tag 139 or 139a may then be located either side of the upper surface 143. Conveniently, the non conducting support means 144a, may alternatively be sides of a container 144 as shown in FIG. 26a.

Conveniently, the decouplers shown in FIGS. 26a to c respectively may incorporate any of the features defined herein, such as for example the use of one or more first conductor layers to create a broadband decoupler, or the use of patterns to create substantially polarisation independent decouplers.

Figure 27:
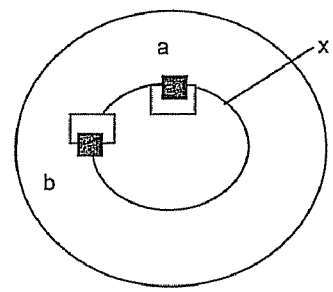
FIG. 27 shows a circular decoupler with varying positions for the RF tag.

FIG. 27 shows the arrangement for Example 13

Figure 28A:
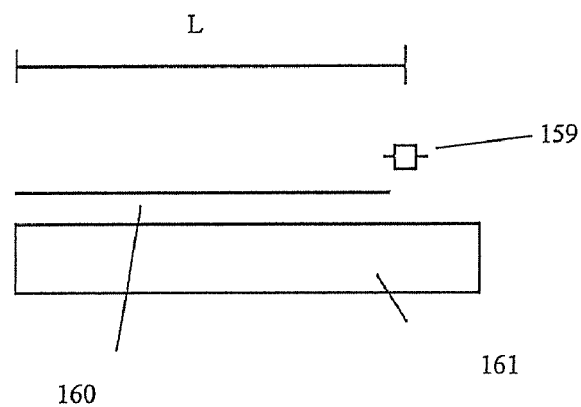
FIG. 28a shows the experimental setup to determine the effects of varying the length of the first conductor layer.

FIGS. 28a and b shows the arrangement for Example 16

Figure 29:
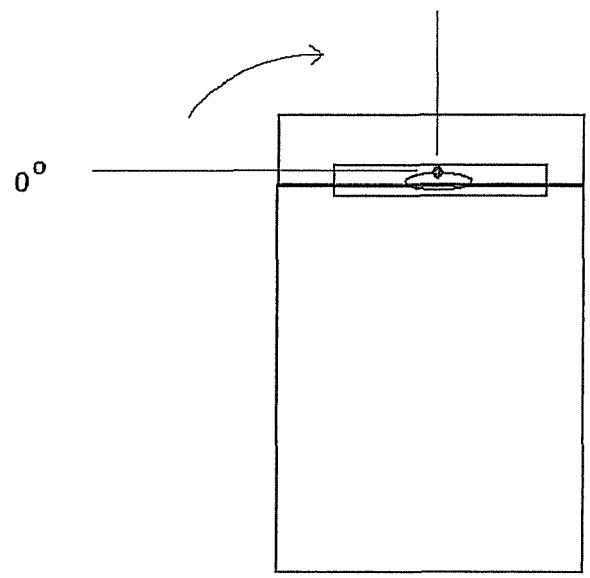
FIG. 29 shows the experimental setup to determine the effects of rotating the RF tag relative to the first conductor layer.

FIG. 29 shows the arrangement for Example 17

Figure 30:
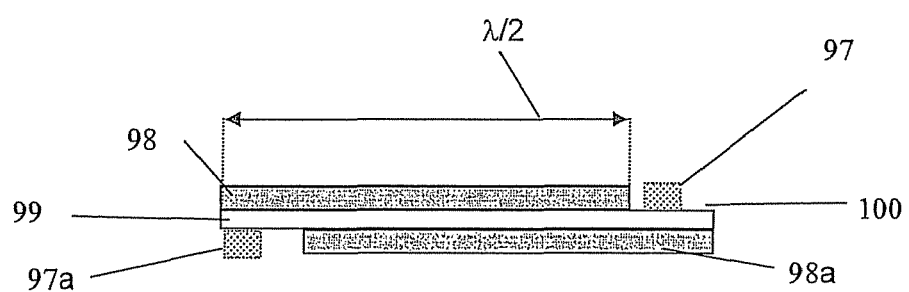
FIG. 30 shows a broad band decoupler with no second conductor layer.

FIG. 30 shows a broad band decoupler with a modified second conductor layer. There is provided a dielectric core layer 99 on the upper side is located a first conductor layer 98 corresponding to a first wavelength, with an RF tag 97 located substantially in the area of absence (in region of high electric field). On the lower surface of dielectric layer 99 there is a further conductor layer 98a which may correspond to the same wavelength or a different wavelength to layer 98, with an RF tag 97a located substantially in the area of absence (in region of high electric field). The set up essentially provides a dielectric layer with a first tuned conductor layer comprising an area of absence mounted either side of the dielectric layer, optionally the two first conductor layers being the same or different in length G, as herein before defined. This arrangement may find proffered use as reduced footprint tagging label allowing the use low Q RF tags.

EXAMPLES OF THE INVENTION

Example 1

Using a non-conducting catalytic ink (as disclosed in Application GB0422386.3. supplied by Sun Chemical under product names QS1, QS2 or DP1607), the decoupling units, i.e. first and second conductor layers, are screen printed (double sided) onto a polymer (which forms the dielectric core) of known electrical properties. The dimensions of the UHF decoupler are subject to the electrical properties and thickness of the polymer. For example, using Quinn plastics, Spectar grade PETG sheet at a thickness of 1 mm, the relative dielectric constant is 3.2, resulting in a decoupler period of 95 mm and a minimum decoupler length of 190 mm (using the approximate formula island length≈$\lambda/(2\sqrt{}$(dielectric constant) where the refractive index is approximately equal to the root of the dielectric constant). The front side of the polymer is printed with the decoupler pattern, four substantially equally sized islands which are separated by two orthogonal lines which intersect at the centre of the decoupler. The reverse side of the decoupler is printed as a solid area.

The ink is cured by heating the sample to approximately 80° C. for 10 minutes (for QS1 and QS2 systems) or by a process of UV curing (for DP1607), in both cases causing the ink to solidify and adhere to the substrate. The printed samples are then placed in a commercially available electroless plating solution (e.g. Enthone 2130® at 46° C. or Rohm and Haas 4750® at 52° C.) and copper metal is deposited only over the areas which are covered with the catalytic ink, at a thickness of 0.1-3.0 microns. The rate of electroless deposition is well defined and hence the thickness of the deposition may be monitored as a function of exposure time. The electrolessly deposited material may optionally be subjected to electrodeposition, if so required.

The resultant product is then laminated with a spacer being placed between the front side of the decoupler and the UHF tag (in this example an 866 MHz, 15 micron UHF tag made by Alien technologies). Typical spacer materials are polymer films, for example Hifi films PMX 946 250 micron PET film. The UHF tag and spacer are located centrally over the area of absence, which is the intersection point of the orthogonal lines.

Example 2

Using a conducting ink, for example Acheson Electrodag PR401B Carbon ink or Acheson Electrodag 503 silver ink, the decoupling units are screen printed (double sided) onto a polymer of known electrical properties. The dimensions of the UHF decoupler are subject to the electrical properties and thickness of the polymer. For example using Quinn plastics, Spectar grade PETG sheet at a thickness of 1 mm, the relative dielectric constant is 3.2, resulting in a decoupler period of 95 mm and a minimum decoupler length of 190 mm. The front side of the polymer is printed with the decoupler pattern and the reverse side is printed as a solid area.

The ink is cured by heating the sample (for Acheson Electrodag PR401B Carbon ink and Acheson Electrodag 503 silver ink), causing the ink to solidify and adhere to the substrate.

The resultant product is then laminated with a functional spacer and mounted on the decoupler in the same manner as defined in example 1.

Example 3

Using a metal-covered polymer film (e.g. DuPont Mylar PET film), an etch resist (e.g. Sun Chemical XV750) is screen printed over the metal surface. Once dried the etch resist is adhered to the surface of the metal in the pattern of the decoupler. The film is then placed in a corrosive solution (e.g. in MAX ETCH™20R from Old Bridge Chemicals Inc). This process removes the un-coated area of metal leaving non conductive substrate only. The metalised patterned film can then be laminated onto a core material and sandwiched with a further metalised un-patterned film, for use as the back plate.

This would then require spacer lamination and tagging as defined in examples 1 and 2.

Example 4

Decoupler Testing Method

A 866 MHz UHF tag reader system (e.g. Sensomatic agile 2 reader unit) is arranged with a computer interface as a detector unit for 866 MHz UHF tags. The reader antenna is placed on a stand facing along a fixed vector, and a tape measure is placed along this path in order to assess each tag's read range. All metallic objects are removed from the reader field area to minimise reflective reads. An 866 MHz UHF tag (e.g. an Alien Technologies tag) is taken and placed on a cardboard substrate. This is moved from a distance of approximately 5 m directly towards the reader antenna whilst observing the reader display, and the read range is taken to be the maximum displacement at which the tag gives a constant read over a period of 1 minute. This value is taken to be the standard read range for the specific UHF tag used.

The tag is then mounted onto the decoupler which is itself adhered to a metallic substrate (in this example an identification plate from the side of a roll cage). The tag, decoupler and metallic substrate are placed in the EM field, to the point at which the system reliably reads the tag over 1 minute. This value is taken as the read range of the decoupled tag system.

Example 5

Figure 5:
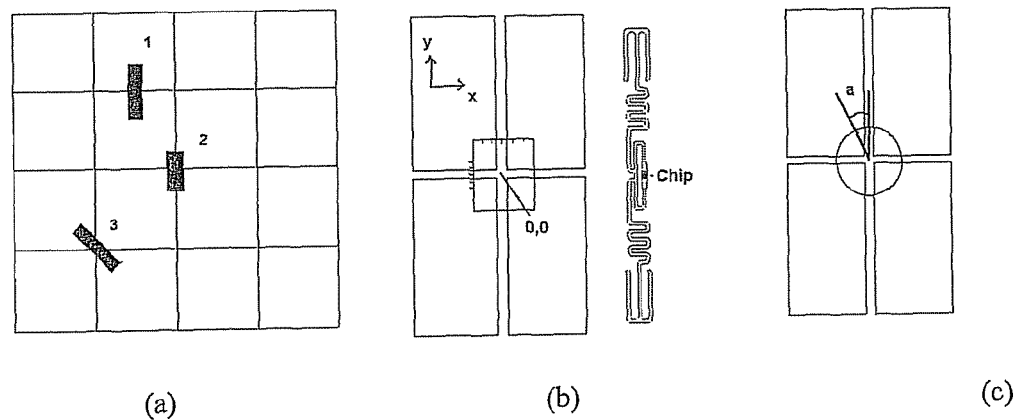
FIG. 5a-c shows a plan view of alternative positions of a UHF tag on a 4 island decoupler as described in the examples

The method outlined in example 4 was used to identify the optimal 2D position of a UHF tag on a decoupler, when the decoupler was mounted on the metallic substrate. FIGS. 5, a, b, c show the relative positions of a tag and decoupler systems.

FIG. 5a schematically represents the possible positions of a tag placed over an area of absence or slits. When applied to a four-island decoupler, the following data is obtained:

TABLE 1 relative position of a tag with respect to a decoupler.

| Experiment reference | Positional reference | Read range (m) |
|---|---|---|
| As shown in FIG. 5a | 1 | 2.1 |
|  | 2 | 3.5 |
|  | 3 | 2.4 |

From the test with an 866 MHz UHF tag, it was found that the read range was significantly improved when the chip of the tag was located over the aperture. The read range was improved further when the chip (and hence antenna) was centrally located at the point of intersection of two orthogonal apertures or slits.

Example 6

FIG. 5 hows the effect of precise location at the point of intersection of the slits on the read range of a UHF tag on a four island decoupler prepared in the above examples. This has the effect of showing how manufacturing tolerances in locating the tag on the decoupler may influence the effectiveness of the decoupler and hence the tag's read range.

TABLE 2 precise position of a tag with respect to a four island decoupler

| Experiment reference | Positional reference | Read range (m) |
|---|---|---|
| As shown in FIG. 5 (b) | −5 mm, 0 mm | 1.2 |
|  | −2.5 mm, 0 mm | 1.2 |
|  | −1 mm, 0 mm | 2.5 |
|  | 0 mm, 0 mm | 4-4.5 |
|  | 1 mm, 0 mm | 4-4.5 |
|  | 2.5 mm, 0 mm | 3.5 |
|  | 5 mm, 0 mm | 2.0 |
|  | 0 mm, −5 mm | 0.5 |
|  | 0 mm, −2.5 mm | 1.2 |
|  | 0 mm, −1 mm | 3.0 |
|  | 0 mm, 0 mm | 4-4.5 |
|  | 0 mm, 1 mm | 3.0 |
|  | 0 mm, 2.5 mm | 1.5 |
|  | 0 mm, 5 mm | 0.5 |

The location 0,0, as referred to in Table 2, denotes the absolute centre of the decoupler unit. The centre of the tag was considered to be the location of the chip (even though the chip in this instance was not in the centre of the RF tag). It was found that the read range was significantly improved when the chip of the tag was centrally located at the point of intersection of two orthogonal area of absence or slits, at a point 0,0 mm. Minor deviations of a few mm along either the x- or y-axis still provide a useful read range, compared to the nil reading of an RF tag placed directly onto a metal surface.

Example 7

FIG. 5c shows the effect of the azimuthal location at the point of intersection on the read range of a UHF tag.

TABLE 3 absolute rotational position of a tag with respect
to the slit on the decoupler

| Experiment reference | Positional reference a° | Read range (m) |
|---|---|---|
| As shown in FIG. 5(c) | −4° | 4.0 |
| | 0° | 4-4.5 |
| | 2° | 4.0 |
| | 6° | 2.0 |
| | 14° | 1.2 |

The positional reference angle a° as referred to in Table 3, denotes the angle of rotation from the slit of the decoupler unit. The reading of 0° was taken to be the situation in which the tag was aligned parallel to the y-axis slit (even though the chip in this instant was not in the centre of the RF tag). It was found that the read range was significantly improved when the chip of the tag was centrally located at the point of intersection of two orthogonal areas of absence or slits, at a point 0°. Minor deviations from a parallel relationship with the slit, such as rotations of less than 6° provide a useful read range, compared to the nil reading of an RF tag placed directly onto a metal surface. More significant deviations in excess of 10° provided a tag which could be read, but the read range was significantly reduced.

Example 8

Improvements to the maximum read-range (compared to an isolated tag in free space) may be achieved by—for example—optimising the spacer thickness. As presented in FIG. 14, the dielectric spacer between the decoupler and the tag may improve the read range of the tag, compared to a tag being read in free space. As PET spacers of increasing thickness are introduced the tag starts to increase its read range, until—at a spacer thickness of approximately 300 microns—the response is identical to that of an isolated tag. Interestingly, at 400 microns a read-range of 4.5 m is attained, adding 0.5 m to the expected maximum. Further increases in the thickness of the spacer slightly degrade the value, although it remains essentially equivalent to that of the isolated tag. After 1000 microns the read range has degraded (not shown in this example), although the tag may still function on a RF reflective surface. Clearly these values show that the decoupler may increase the read range of a RF tag when compared to its unadorned, free-space performance. These results are specific to the Sensormatic kit, it will be clear that optimum separation/spacer thickness may be different for different RF tags or reader systems.

It appears that the decoupler performs the function of trapping the incident 866 MHz radiation from the antenna and channels the energy into the RFID. The electric field strength both in and just above the slit is intense as is shown in FIG. 15, (generally enhanced 150 to 200-fold), and this may interact with the tag if it is placed at a suitable height above the metal surface.

Whilst a PET core device (complex permittivity (3.20, 0.0096)) has been demonstrated successfully, a lossier core material such as FR4 (permittivity (4.17, 0.0700)) may not function as efficiently as PET, however FR4 still provides very useful read ranges.

The read range in the above experiments 5 to 8 are standardised read range measurements as defined in example 5 (a stable 1 minute reading). Deviations from substantially centrally located tags (both angular and/or linear displacement) still provide a tag which can be interrogated on a metallic surface. Conveniently, exact centrality of the tag on the slits of the decoupler is not a prerequisite for the decoupler to function, but it does provide improved performance. However, in a real life situation only a fraction of the standardised (1 minute read time) is required to achieve interrogation and response from the tag, and hence the actual read range of the tag may be higher than that stated in the above experiments.

Example 9

A four island decoupler was made by the method in Example 1. The decoupler was prepared for an 866 MHz tag and was manufactured with a 1000 micron polyester core. An Alien Technologies 866 MHz tag was located centrally over the area of absence to provide for optimum response. An RF tag without a decoupler and the RF tag on a decoupler were mounted on a variety of surfaces and articles to assess the effect of the surface on a normal RF tag and the effectiveness of the decoupler. The reader system was a Sensormatic® kit.

TABLE 4 read range of RF tags without decoupler and with
1000 μm polyester decoupler.

| Surface | Read-range without Decoupler (cm) | Read-range with Decoupler (cm) |
|---|---|---|
| Free Space | 320 | 320 |
| Corrugated cardboard only (dry) | 310 | 320 |
| cardboard + backed by plastic mineral water bottles | 125 | 310 |
| cardboard + backed by cartons of Orange Juice | 110 | 310 |
| cardboard + backed by Metallic baked beans cans | 120 | 310 |
| cardboard + backed by glass lager bottle | 125 | 310 |
| On damp cardboard (12.5% moisture content) | 180 | 320 |
| On wet cardboard (19.5% moisture content) | 50 | 310 |
| With ½ tag obscured by human hand | 70 | 250 |

As expected the read-range of the decoupler in free-space matches that of the tag in free-space at 320 cm. It can be seen that the presence of consumables inside the cardboard box reduces the read-range of the tag without a decoupler to between one-third and one-half of that of the read range value obtained in free-space. The advantage of using the decoupler is that the read range is effectively the same as that in free space and is independent of the surface on to which it is mounted.

Dampening the cardboard or even saturating it makes almost no difference to the read-range afforded by the decoupler, whereas it severely reduces the read-range when no decoupler is used. Only the obscuration of 50% of the decoupler surface slightly reduces the read-range. Clearly his would overcome the attempts of a person trying to conceal an item under their clothing or similar materials.

Example 10

Three different core materials were tested: polyester, polypropylene and polycarbonate, at a variety of different core thicknesses. The first and second conductor layer patterns were all the same geometry and thickness and optimised for an 866 MHz RF tag and reader. The decoupler was placed on a metallic surface such that an RF tag without a decoupler would give substantially zero read range. From the graph in FIG. 23 as the core thickness increases the read range increases. Modelling which has been validated (as shown in Example 11) has shown that there is only a few cms increase in read range when you increase the core thickness from 1000 microns to 2000 microns.

The wavelength at 866 MHz in free-space is 346 mm. If the core material is polyester then the wavelength in the material is 193 mm at 866 MHz. Hence if the core is 1 mm (1000 microns) thick then the material is 1/346 of a free-space wavelength thick or 1/193 of a material wavelength thick. Hence the wavelength in the material is the free-space wavelength divided by the refractive index which for polyester is c.1.8

| Material thickness (mm) | Fraction of the wavelength in the material |
| --- | --- |
| 1 | 1/193 |
| 0.5 | 1/387 |
| 0.25 | 1/774 |

Table 5 shows the fraction of wavelengths tested in FIG. 23

Example 11

A series of decouplers were manufactured to the dimensions that would give the greatest field enhancement at 866 MHz as determined by using HFSS. To ensure optimum performance and validate the model HFSS, a series of tests were performed. These entailed starting with a decoupler that had metal islands in the upper layer that were longer than the requisite value obtained from HFSS. The read-range was measured as the length of the metal islands was progressively reduced by etching away material, starting at the ends of the decoupler and working inwards towards the centre. Results for the prototype polycarbonate decouplers are shown in below. The optimum metal island lengths determined by these tests are in very close agreement with those determined from HFSS modelling

TABLE 6

Optimised island lengths for an 866 MHz tag.

| Dielectric core material | Optimum island length - theory (cm) | Optimum island length - experiment (cm) |
| --- | --- | --- |
| Polyester | 9.65 | 9.5-9.9 |
| Polycarbonate | 10.0 | 9.7-10 |
| Polypropylene | 11.2 | 11.1-11.3 |

Example 12

A series of single island decouplers with different core thicknesses and widths were evaluated. The decoupler was prepared according to the method of Example 1 using copper as the conductor layer and a PETG core. The pattern of the decoupler is that as shown in FIG. 22b. The tag employed was a low Q antenna (i.e. not optimised for use at 866 MHz), of the type shown in FIG. 22a. The read range of the tag in free space is negligible as it does not have an optimised antenna. Similarly, when the low-Q tag was placed directly on a metal surface there was no read range. The table below shows results of the RF tag on a decoupler, where the decoupler is placed on a metal surface.

TABLE 7

Single island decouplers

| Decoupler | Length (mm) | Width (mm) | Thickness | Tag type | Read range on metal |
| --- | --- | --- | --- | --- | --- |
| I-F-200 | 110 | 20 | 0.25 mm | Class1 Gen 1 | 0.2 m |
| I-F-750 | 110 | 20 | 0.5 mm | Class1 Gen 1 | 0.75 m |
| I-R-1500 | 110 | 20 | 1.0 mm | Class1 Gen 1 | 1.5 m |
| I-R-2500 | 110 | 48 | 1.0 mm | Class1 Gen 1 | 2.5 m |

It can be clearly seen that the decoupler allows low-Q tags to be decoupled from metal surfaces. As the thickness of the core increases so does the read range of the RF tag. Similarly, as the width of the tag increases for a fixed core thickness the read range increases. Certain applications such as tracking logistics containers will benefit from larger area and thicker core decouplers as read range may be important. However, consumer items may only require read ranges of a few cms at a point of sale or checkout, and so may benefit from smaller area and thinner tags.

Further materials which may be used as the dielectric core are foamed materials, such as for example PVC, polystyrene etc. The real part of the permittivity of this material is very low, as is the imaginary part. This lends itself to making a decoupler that is very thin as the lower permittivity will give good read-range at small thicknesses. In order to metallise the foam it may be necessary to create a laminate structure in which the metal is deposited on very thin (e.g. 10 micron) polymer film which is then stuck onto the foam core. Alternatively high-specification radio frequency laminates may be used. There exists a variety of PCB laminate materials specifically designed for the production of highly efficient radio frequency circuits. These consist of a metal-dielectric-metal sandwich of which the upper metal layer could be selectively etched to produce a decoupler. Examples include: Rogers RO 4003 or TR/Duroid 5880, Arlon DiClad 880, Neltec NY9220 or Taconic TLY. Yet further alternatives include ceramic materials; these will have high real permittivities and may therefore result in thinner and less flexible decouplers: examples include alumina, silica, glass etc. It may even be desirable to use elastomers e.g. silicone rubber due to their flexible nature. Furthermore, mixing a filler into an elastomer matrix could allow the material properties to be tailored.

Example 13

A polarisation-independent decoupler of the type shown in FIG. 21f was prepared by scoring a circular slit (x) into the copper layer of a first conductor layer on a circular copper-PETG-copper laminate of radius 4.65 cm. The tag was mounted onto a spacer. The inductance loop was located on the slit (FIG. 27, position x) and the read range measured as detailed previously using the reader system. It was found that the read range improved when the loop antenna was substantially at a position at a tangent to the curve (FIG. 27, position a), compared to when the antenna was orthogonal to the slit (FIG. 27, position b).

The diameter of the inner circle was increased from 30 mm to 50 mm diameter, and measurements of read range were taken, as well as of the rotational angle range over which the tag cold be read.

TABLE 8 the effect of the diameter of circular slit on read range

| | Position A | |
|---|---|---|
| Inner circle Diameter (mm) | Read Range (cm) | Rotation (degrees) |
| 30 | 20 | 360 |
| 34 | 120 | 360 |
| 36 | 40 | 45 |
| 40 | 90 | 360 |
| 42 | 20 | 10 |
| 43 | 40 | 360 |
| 45 | 25 | 40 |
| 50 | 8 | 20 |

As the diameter of the inner circle increases, the read range in general decreases, as does the degree of rotation achievable for that read range. Variation of the overall decoupler shape (e.g. a circular, square, rectangular, quadrangle area outside of the circular slit) does have some effect on the performance, such that the read-range is not simply proportional to the overall area. Preferably the shape of the overall decoupler, when used with a circular slit, is a quadrangle with non uniform sides. One possible explanation, which does not limit the scope of the invention, is that regular shapes may exhibit secondary resonant effects that destructively interfere with the slit resonances.

Example 14

A series of experiments were carried out with single island decouplers prepared from cardboard dielectric layers. The effect of changing the resonant cavity by either removing or altering the second conductor layer and stand-off distances was explored. The experiment was conducted on full size antennas (i.e. those commercially available with tuned antennas, typically 95 mm long) and low Q RF tags with a loop antenna (longest dimension less than 20 mm).

TABLE 9 effect of resonant cavity on read range in free space.

| | Read range | Read range with only first conductor layer and dielectric | Read range tuned decoupler |
|---|---|---|---|
| Full size antenna | 7 m | 7 m | 8 m |
| Loop antenna(low Q) | 30 cm | 1 m | 7 m |

In this experiment the RF tag (Alien technologies) was located at the optimum position as shown in FIG. 28a, with the RF tag placed over the area of absence at the point of increased electric field strength, approximately 0.5 mm from the first conductor layer and also at a spaced distance from the decoupler which is less than 1000 microns. The fixing point was kept constant throughout the experiment.

For the full size RF tag a read range in air was measured as 7 m, which was the manufactures expected read range in free space. When the tag is placed on a structure with only a tuned first conductor layer and a dielectric layer (i.e. an incomplete—'backless'—decoupler) there is no change in the read range. This again is expected as the first conductor layer acts as a poor antenna in this set up. It should be noted that when the full RF tag was placed directly in the middle of the 1$^{st}$ conductor layer the read range was 0 m. This is expected as metal is known to disrupt the RF tag. When the full size RF tag was placed on a tuned decoupler, there was a modest increase in read range to 8 m. From the above detailed experiments (Experiments 1-13) it has already been shown that the RF tag on the decoupler gives substantially the same read range in both free space and on metallic like surfaces. The decoupler provides a slight benefit to commercially available tuned RF tags if they are exclusively going to be used in free space. However, the decoupler provides a significant advantage over prior is art patch antenna or balanced antenna when the RF tag is to be placed near a metallic surface (or any other which interacts with RF radiation).

For the RF tag with the low Q loop antenna, there is a modest read range in air, 30 cm. When the low Q RF tag is placed on the structure with only a conductor layer and a dielectric layer, there is a further modest increase in read range to about 1 m. However, there is a large increase in read range when the low Q RF tag is placed in the optimum position on a tuned decoupler. The read range now approaches that of the full size commercially available antenna in free space. Furthermore, from the previous Experiments (1-13) it has already been shown that the low Q RF tag, when mounted upon the decoupler, gives essentially the same read range in both free space and when the decoupler is placed onto, or forms an integral part of, a metallic surface.

Example 15

Previous Experiments have shown that optimal stand-off distance between the RF tag and the decoupler's first conductor layer occur at distances preferably less than 1000 microns, as shown in FIG. 14. An experiment was set up to show that the decoupler works in a different mode to substrates which bear an antenna on a dielectric layer.

The conductor layer on a dielectric layer structure, as used in Experiment 14, was again prepared, and the distance between the commercially available RF tag and the first conductor layer was varied. The read range for the RF tag remained at 7 m, over the range of 250 micron to 4000 micron. It was hence shown that the interaction between a 'backless' decoupler and a standard UHF tag is different to that between a full decoupler (i.e. enclosed core structure) and the same tag.

Example 16

Figure 28B:
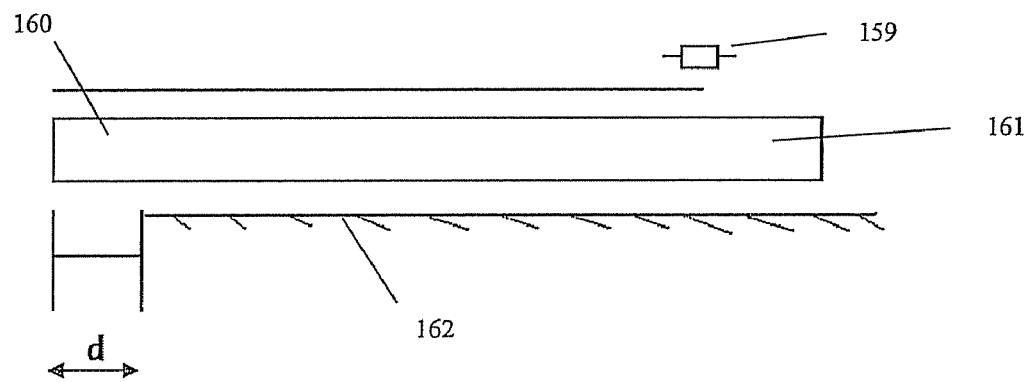
FIG. 28b shows the experimental setup to determine the effects of varying the length of the second conductor layer.

The length of the second conductor layer and its effect upon the likely formation of a resonant cavity was tested by decreasing the overlap of the second conductor layer by an amount "d", as shown in FIG. 28b. In this experiment the second conductor layer was a large metal sheet. The commercially available RF tag without a decoupler gives a read range of substantially 0 m. In this set up the degree of overlap of the second conductor layer was altered. This was achieved by moving the dielectric and first conductor layer relative to the metal sheet.

TABLE 10

Read range of Tag with increasing off set of second conductor layer.

| Overlap offset d (cm) | Read range |
|---|---|
| 4.8 cm | 80 cm |
| 2.6 cm | 180 cm |
| 1.6 cm | 300 cm |
| 0 cm | 700-800 cm |

As the degree of overlap decreases (i.e. "d" becomes larger) then the cavity created between the first and second conductor layer decreases in length and hence its expected resonant wavelength will diverge from that of the RF tag resonant frequency. As expected, there is a significant fall off in read range when the length of the cavity is made shorter than the optimum tuned cavity length i.e. reduced from 8 m to less than 3 m. Again, this proves that it is the cavity structure (i.e. the metal/dielectric/metal trilayer) that dictates the behaviour of the decoupler, and not simply the presence of the metallic patch presented by the first conductor layer.

Example 17

This experiment determined the effect of the degree of rotation of a loop antenna placed onto a single island decoupler, as shown in FIG. 29.

TABLE 11 effect of angle on read range.

| Angle | Read range (as % of 90 degrees value) |
|---|---|
| 0 | 0 |
| 5 | 25 |
| 10 | 33 |
| 20 | 40 |
| 30 | 100 |
| 50 | 100 |
| 70 | 100 |
| 90 | 100 |
| 110 | 100 |
| 130 | 100 |
| 140 | 83 |
| 150 | 75 |
| 155 | 58 |
| 165 | 28 |
| 170 | 22 |

In this experiment the read range was measured as a percentage of the 90° maximum read range achieved. The 90° orientation, as can be seen from FIG. 29, is when the long axis of the loop antenna lies in parallel with the electric fields generated in the resonant cavity. In this orientation it causes a potential difference to be set up across the two terminals of the antenna. Rotation of the decoupler may cause the antenna to interact with a smaller percentage of the electric field. It is clear from the results that the magnitude of the electric field is sufficient to allow for relatively large rotations to be permissible, preferably in the range of 30° to 150°, more preferably 70° to 110° yet more preferably substantially 90°. Tolerances in manufacture should preferably be in the range of from 85° to 95°. In contrast with the earlier rotation experiments using the four island decoupler and a standard RF tag, the low Q antenna on a single island decoupler is effected to a lesser extent by rotation of the tag on the surface of the decoupler.

The experiments above correlate well with the modelled data shown in FIGS. 6 to 17, inclusive.

The invention claimed is:

1. A radiation decoupler for decoupling radiation from a conducting surface, said decoupler comprising:
a dielectric layer having a first surface and an opposing second surface;
a first conductor layer in contact with at least one dielectric layer surface, wherein the first conductor layer has at least one area of absence where the first conductor layer does not overlie the dielectric layer; and
an electronic device including an RF tag electrically connected to an antenna wherein the electronic device is located in the area of absence of the first conductor layer such that the electronic device antenna is electrically isolated from the first conductor layer, wherein the decoupler is adapted such that, in use, an electromagnetic field is enhanced in the vicinity of the area of absence of the first conductor layer.

2. The radiation decoupler of claim 1 wherein a second conductor layer contacts the dielectric layer second surface.

3. The radiation decoupler of claim 1 wherein the second conductor layer is the conducting surface from which radiation is decoupled.

4. The radiation decoupler of claim 1 wherein the RF tag is located at an edge of the dielectric layer.

5. The radiation decoupler of claim 1 wherein at least one edge of the dielectric layer forms at least a portion of the at least one area of absence.

6. The radiation decoupler of claim 1 wherein the at least one area of absence is located on the decoupler substantially at a point which corresponds to an increased dielectric field.

7. The radiation decoupler of claim 2 wherein the device antenna is electrically isolated from the second conductor layer.

8. The radiation decoupler of claim 2 wherein the length of the first conductor layer and second conductor layers are different.

9. The radiation decoupler of claim 1 including two or more electronic devices.

10. The radiation decoupler of claim 1 including a plurality of areas of absence.

11. The radiation decoupler of claim 1 wherein the RF tag is a low-Q tag.

12. The radiation decoupler of claim 1 wherein a spacer material layer separates the RF tag from the decoupler.

13. The radiation decoupler of claim 1 wherein a protective housing covers the decoupler.

14. The radiation decoupler of claim 1 where the RF tag has a resonant frequency and wherein the decoupler has a selected resonant frequency that substantially matches a resonant frequency of the RF tag.

* * * * *